Jan. 2, 1945.  F. LAMBACH  2,366,340
METHOD AND MACHINE FOR MAKING HOSIERY
Filed March 16, 1939  17 Sheets-Sheet 1
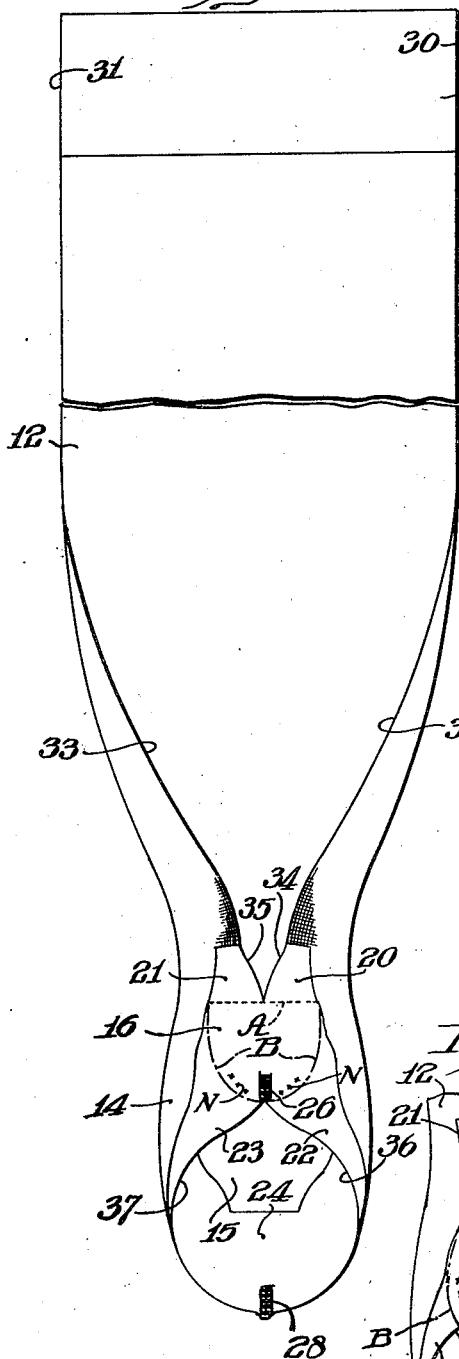
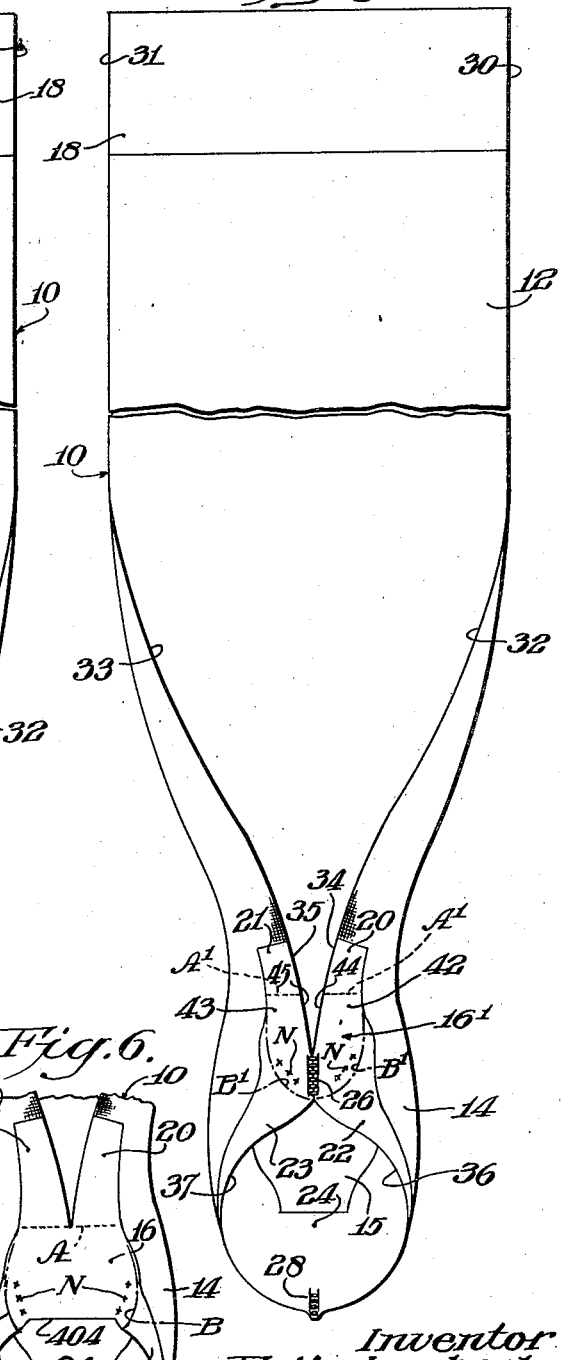
Inventor
Fritz Lambach
By William R. Smith
Attorney

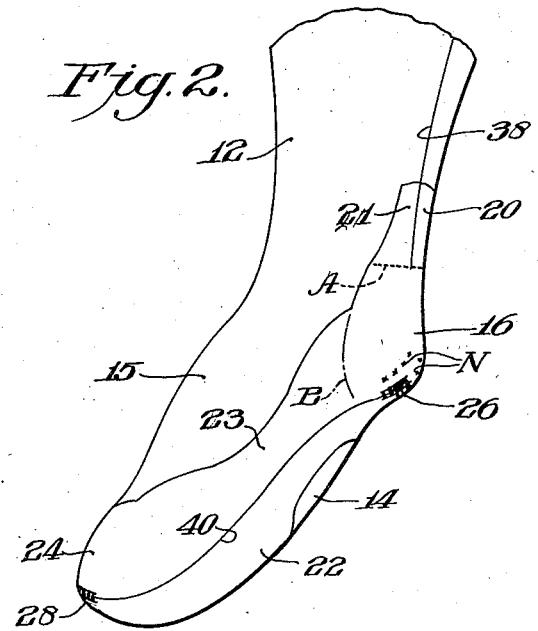
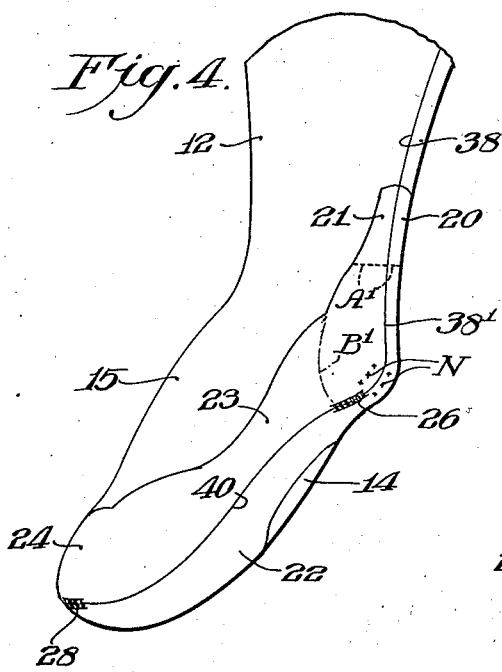
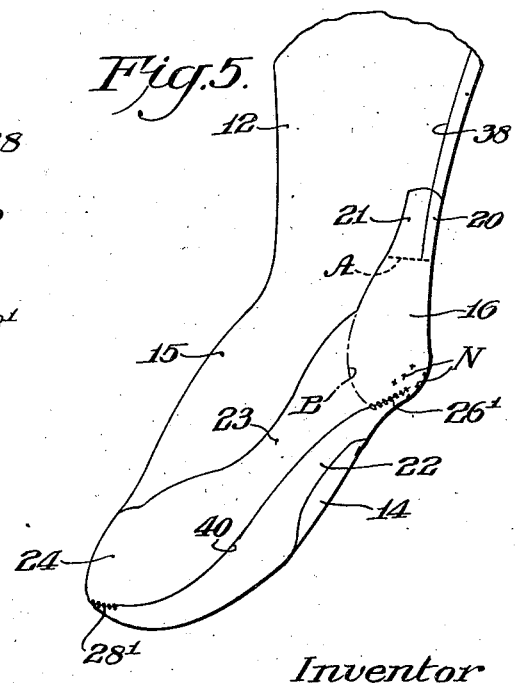

Jan. 2, 1945.  F. LAMBACH  2,366,340
METHOD AND MACHINE FOR MAKING HOSIERY
Filed March 16, 1939  17 Sheets-Sheet 3
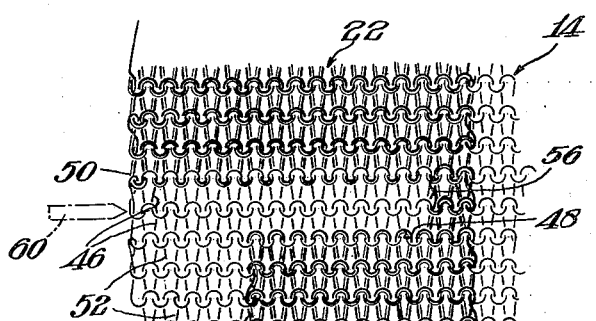
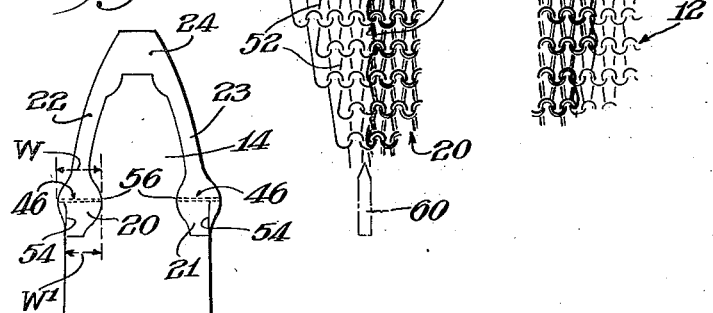
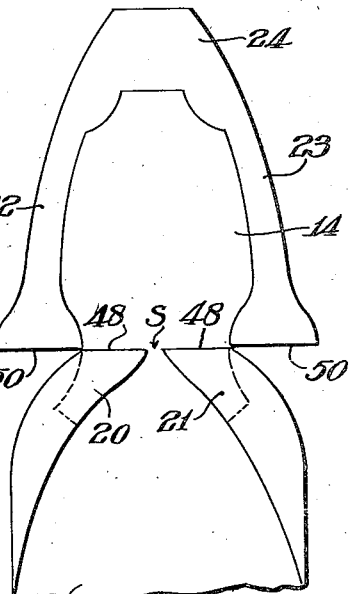
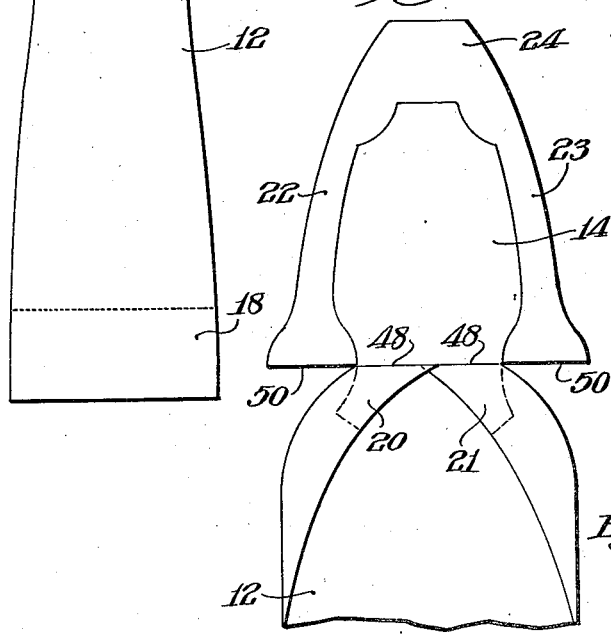
Inventor
Fritz Lambach
By William R. Smith
Attorney.

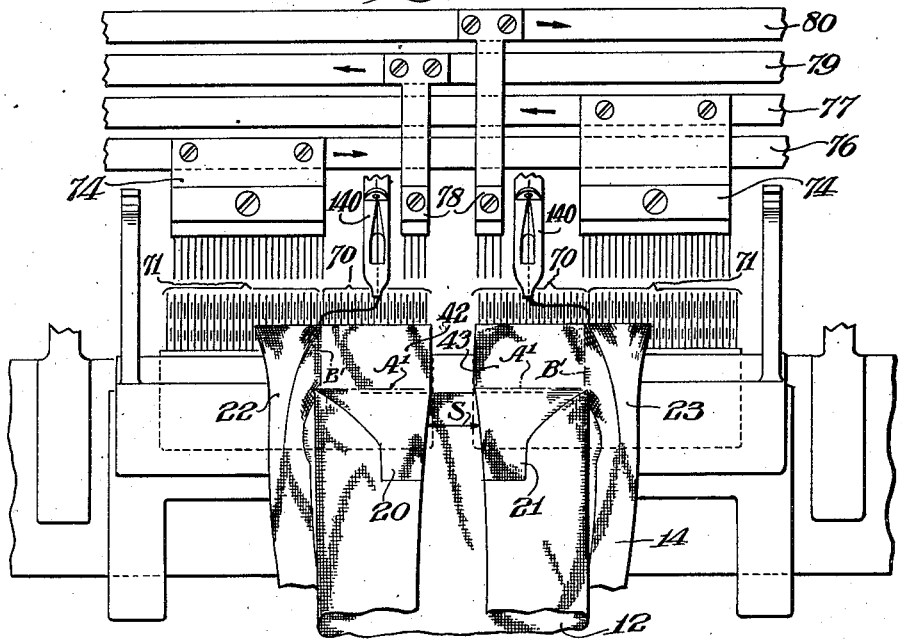
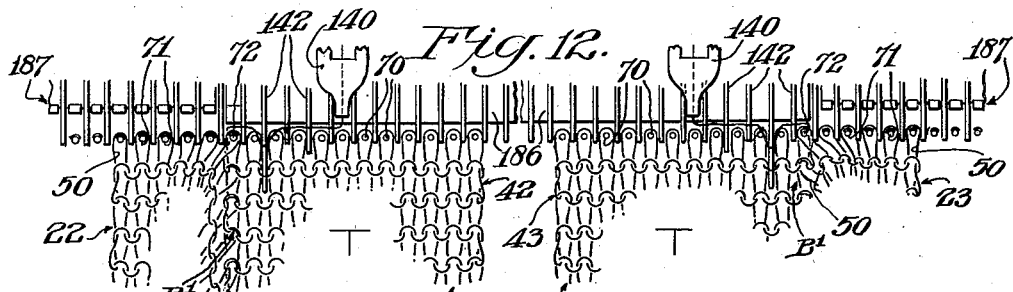
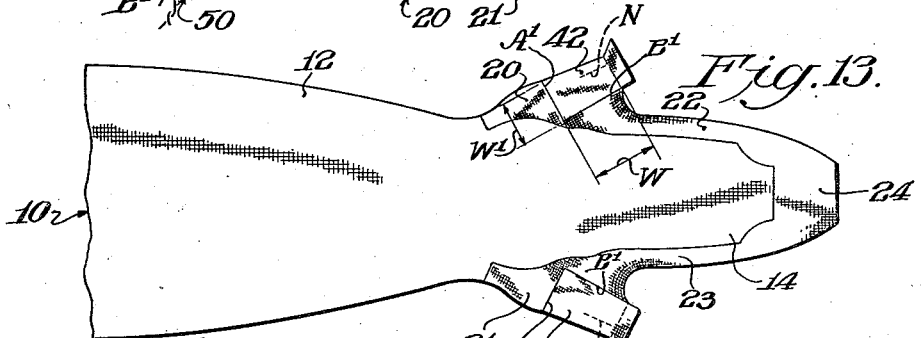

Jan. 2, 1945.  F. LAMBACH  2,366,340
METHOD AND MACHINE FOR MAKING HOSIERY
Filed March 16, 1939   17 Sheets-Sheet 5
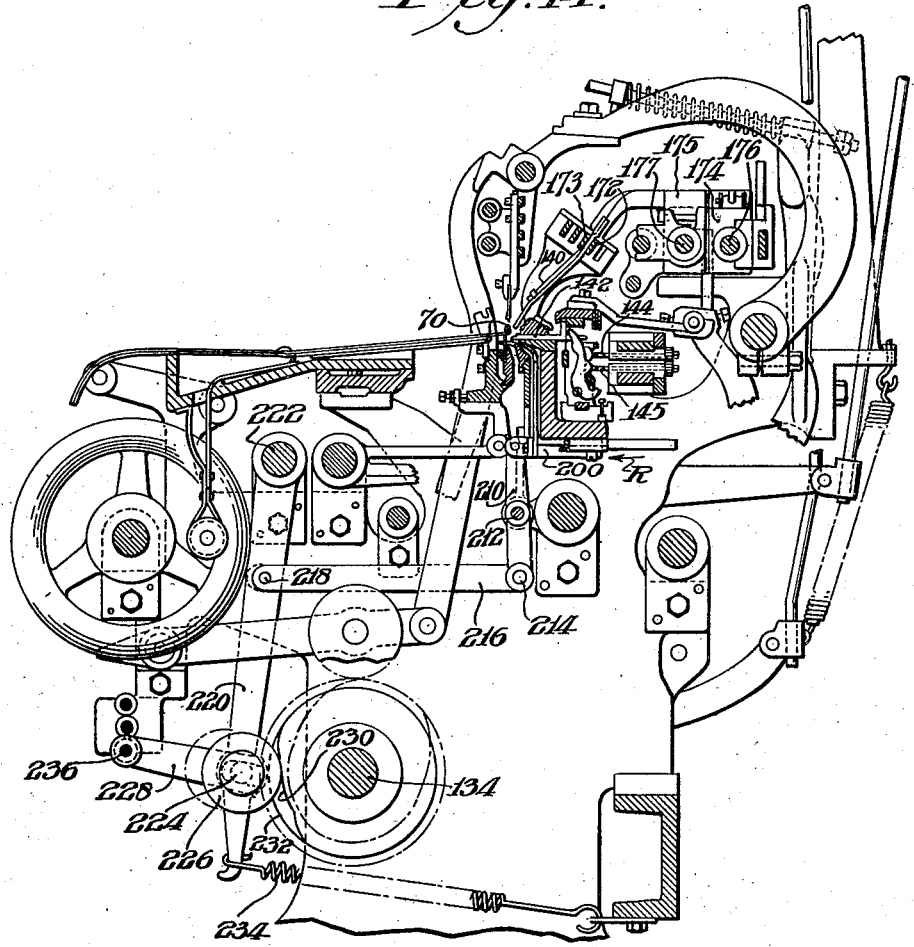
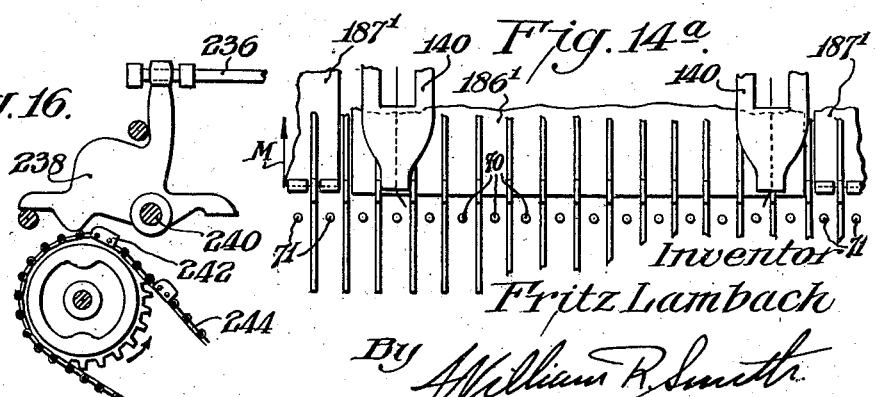
Inventor
Fritz Lambach
By William R. Smith
Attorney.

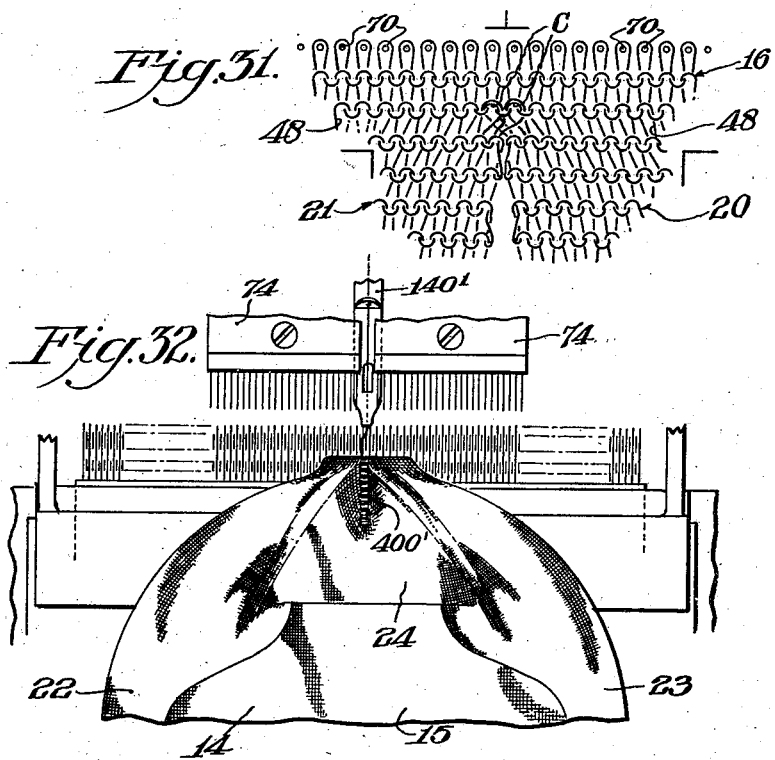
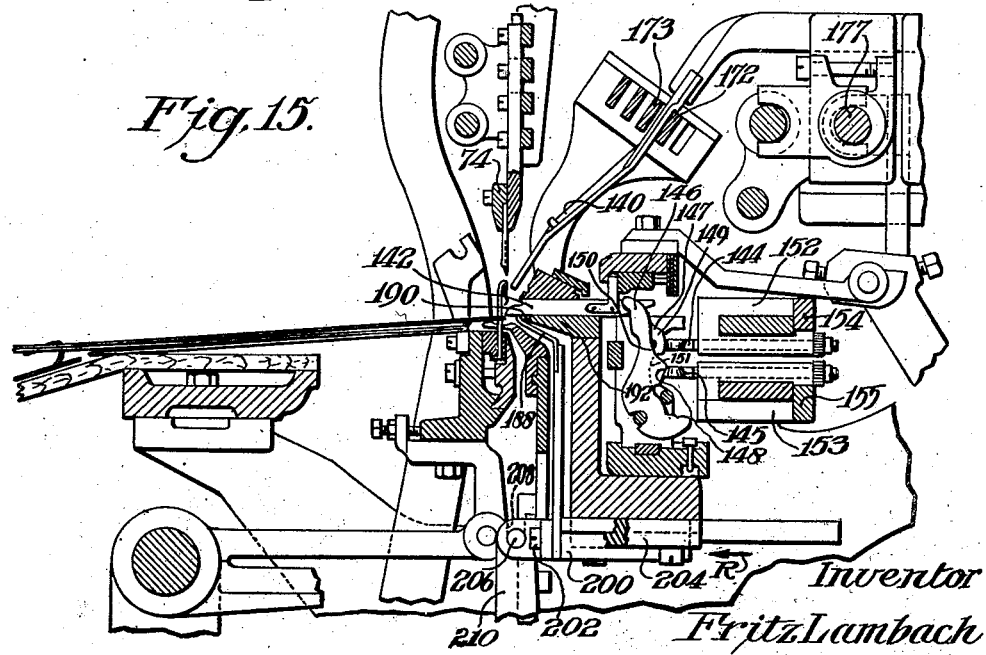

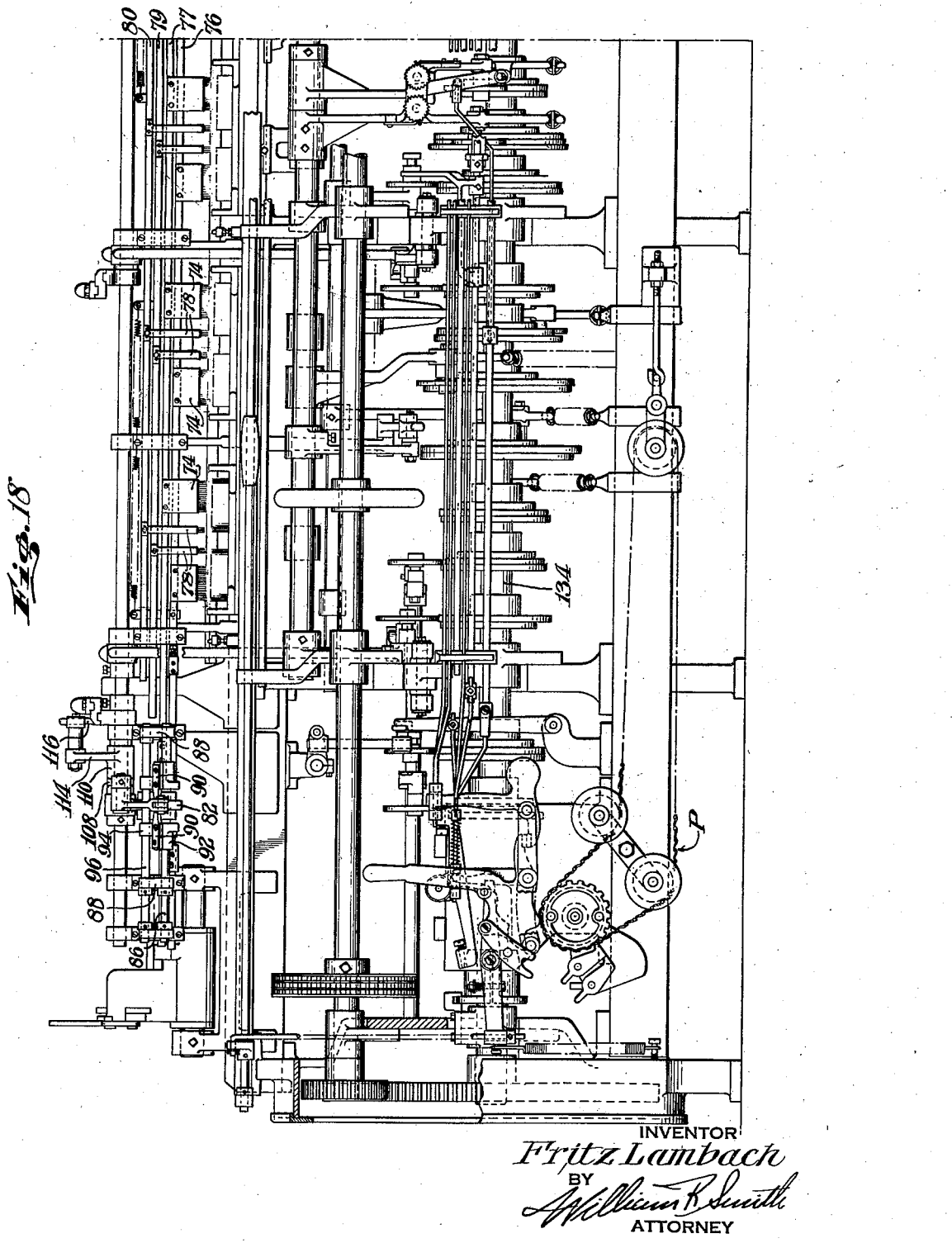

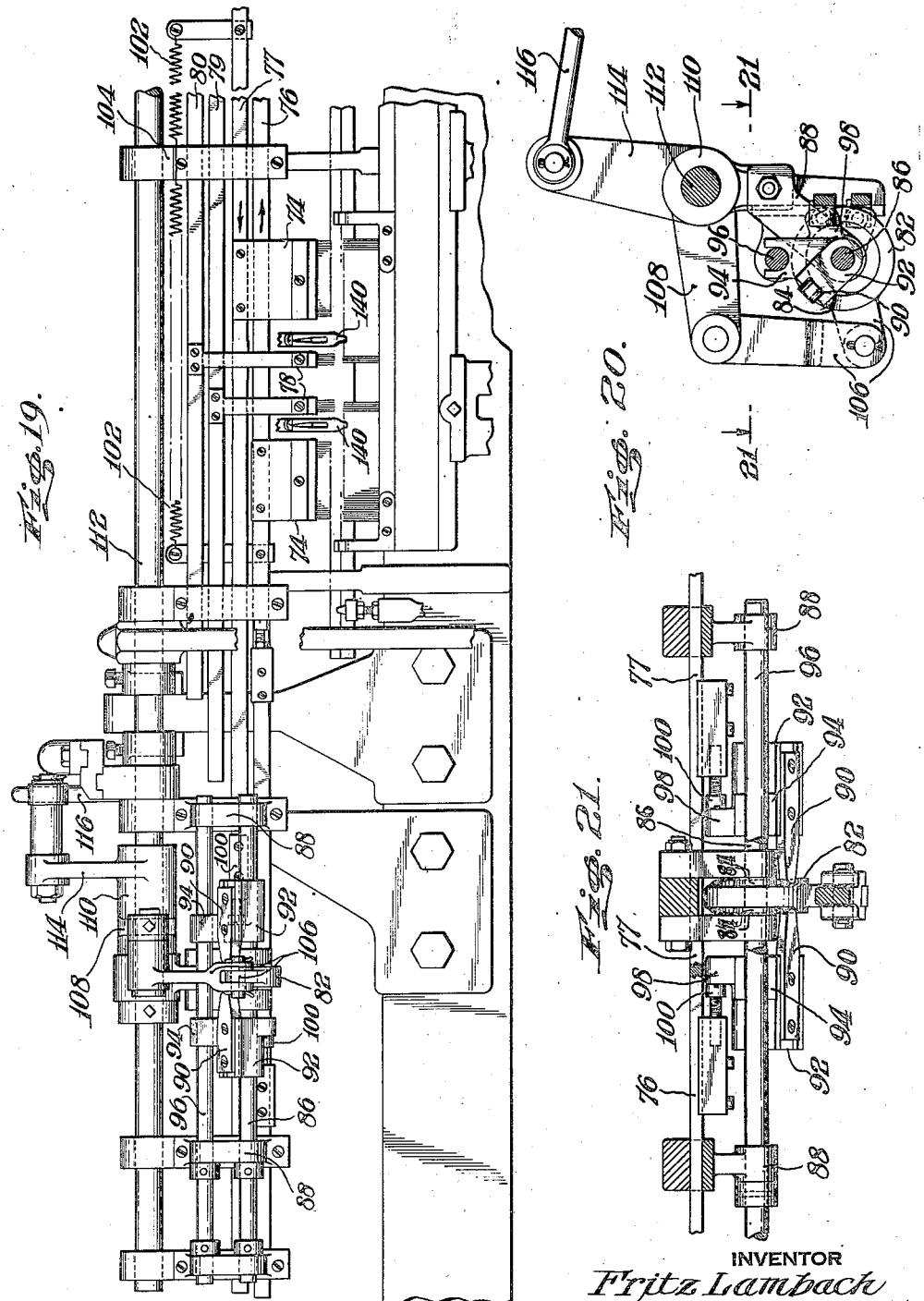

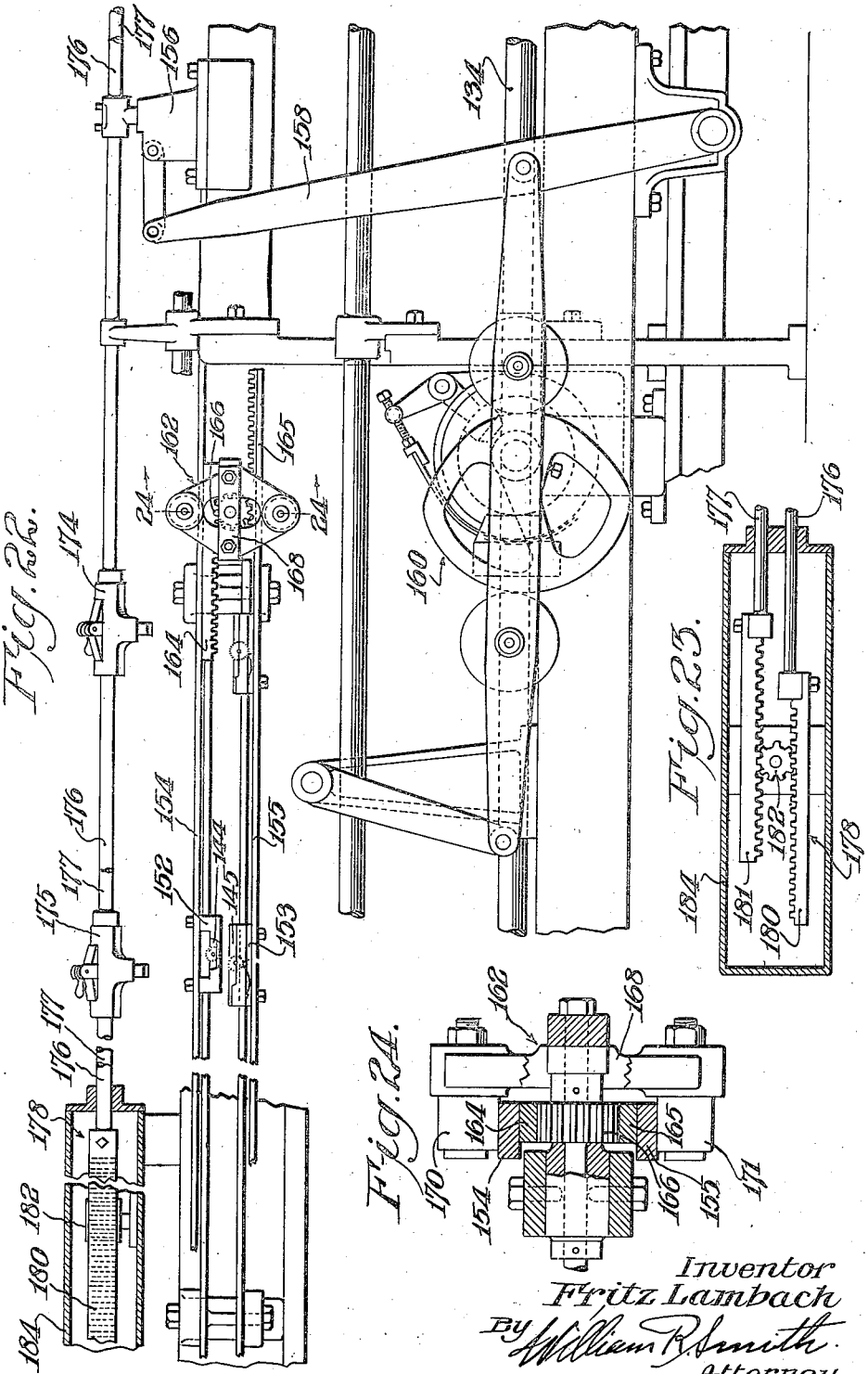

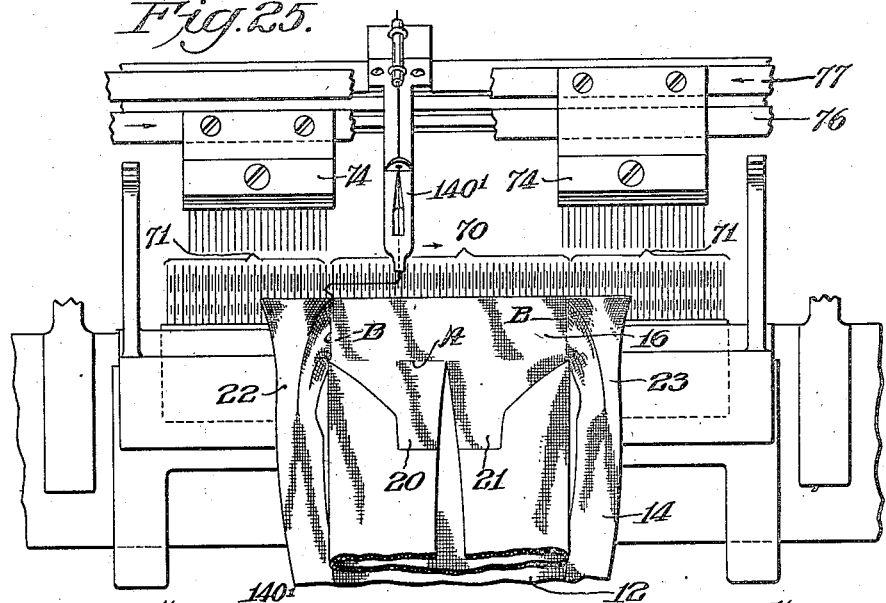
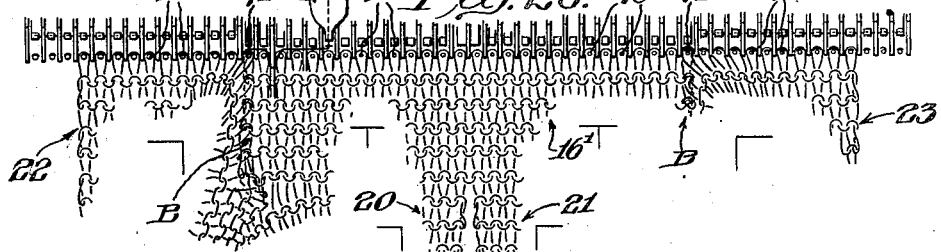
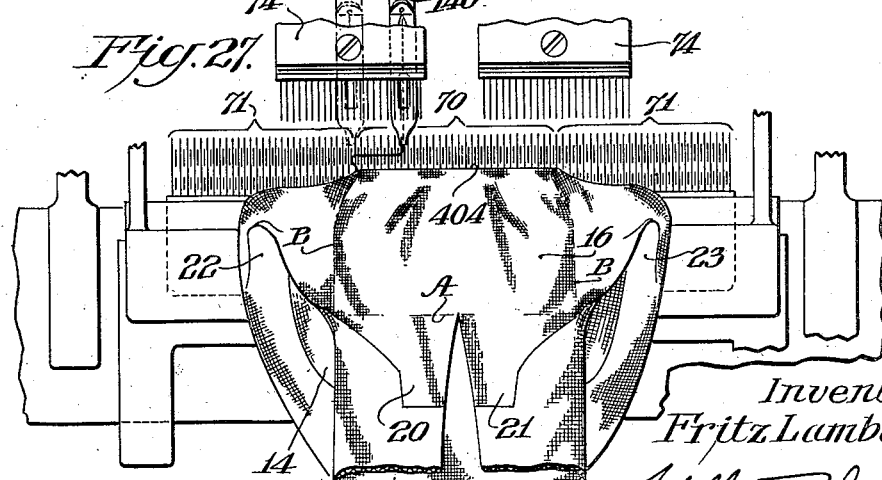

Jan. 2, 1945.   F. LAMBACH   2,366,340
METHOD AND MACHINE FOR MAKING HOSIERY
Filed March 16, 1939   17 Sheets-Sheet 12
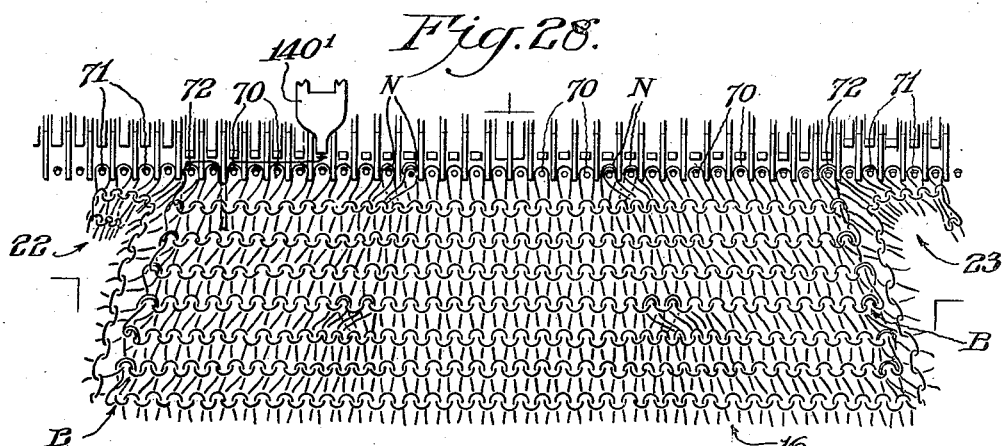
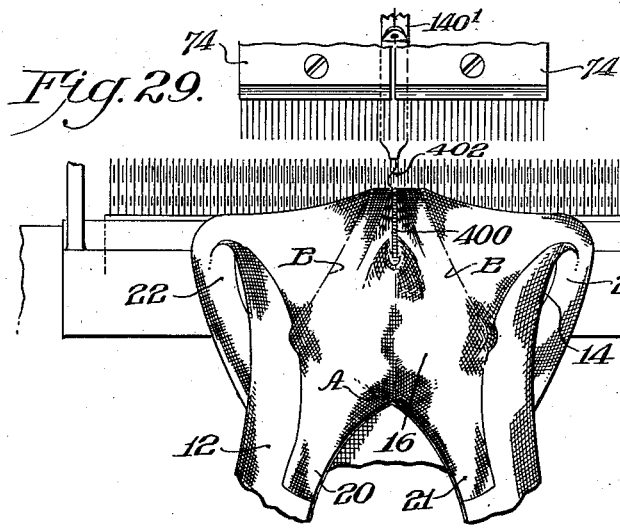
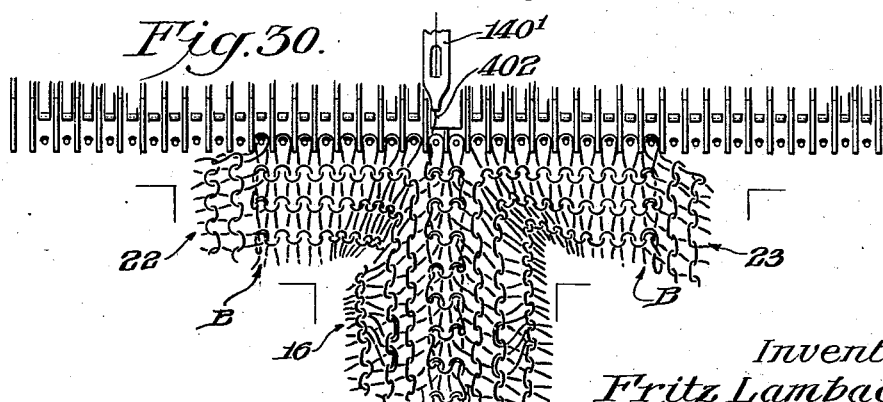
Inventor
Fritz Lambach
By William R Smith
Attorney

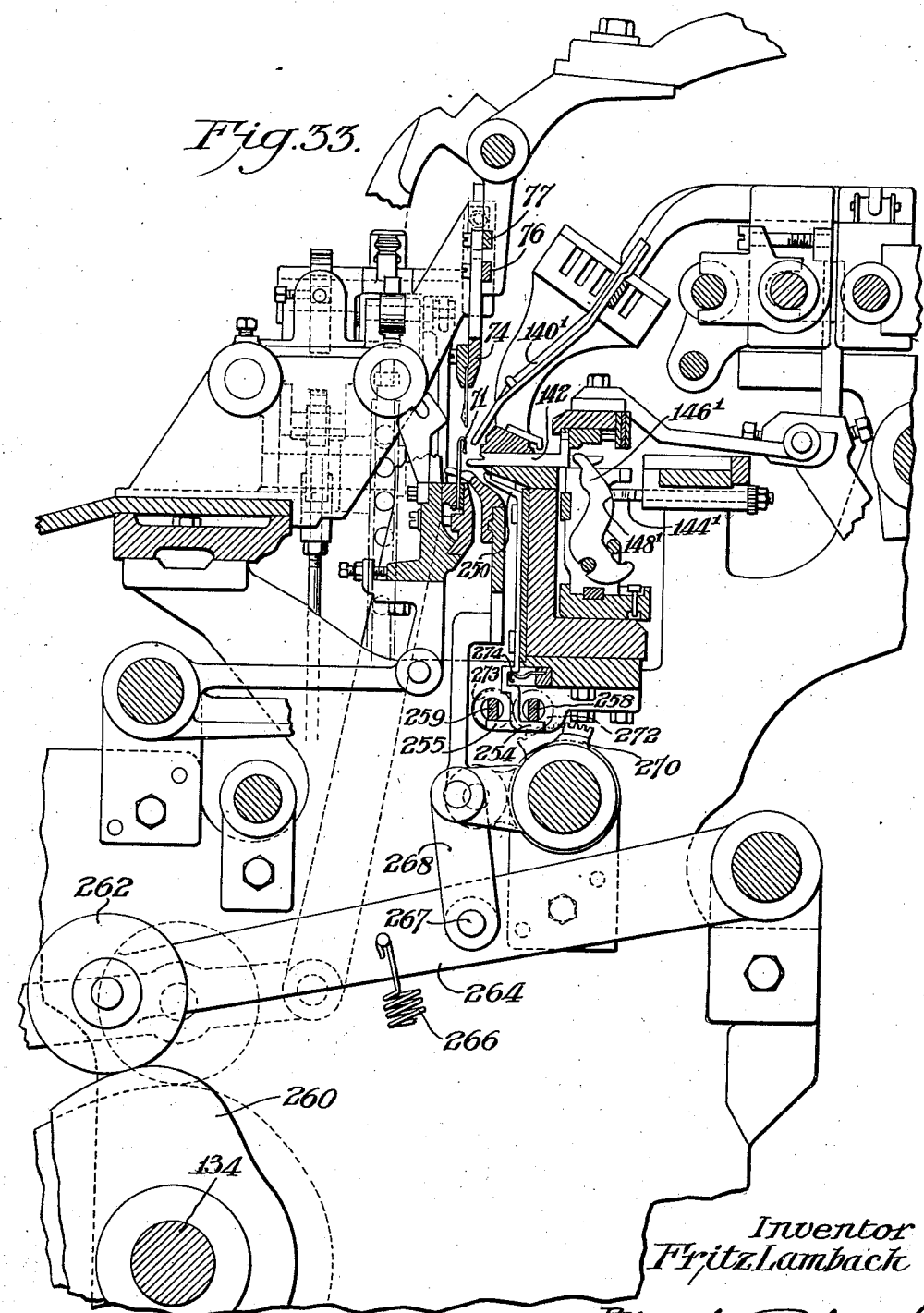

Jan. 2, 1945.   F. LAMBACH   2,366,340
METHOD AND MACHINE FOR MAKING HOSIERY
Filed March 16, 1930   17 Sheets-Sheet 14
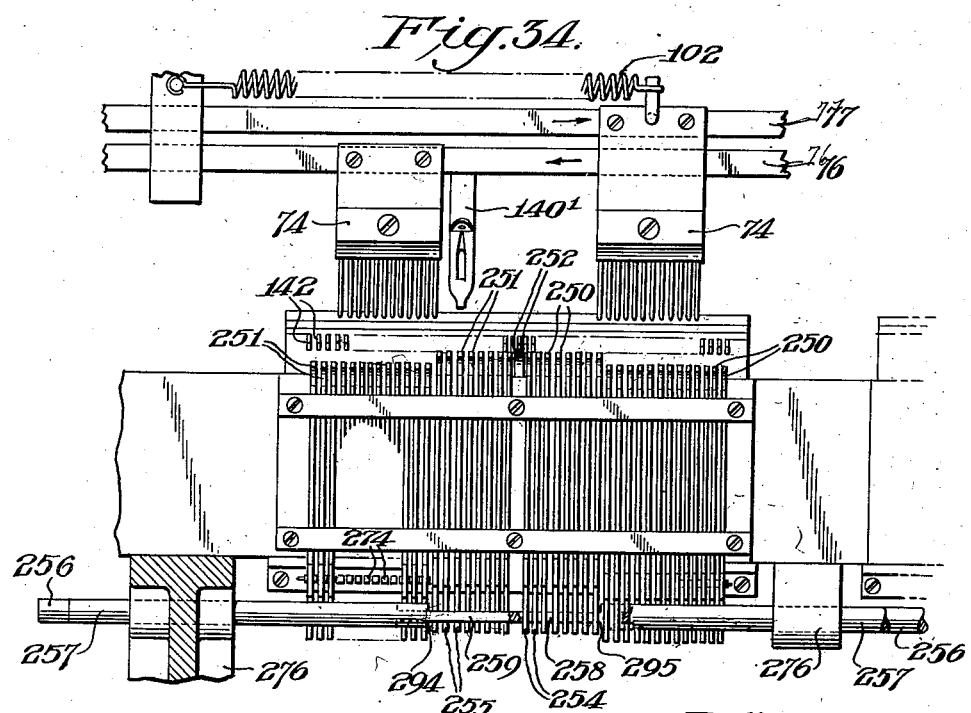
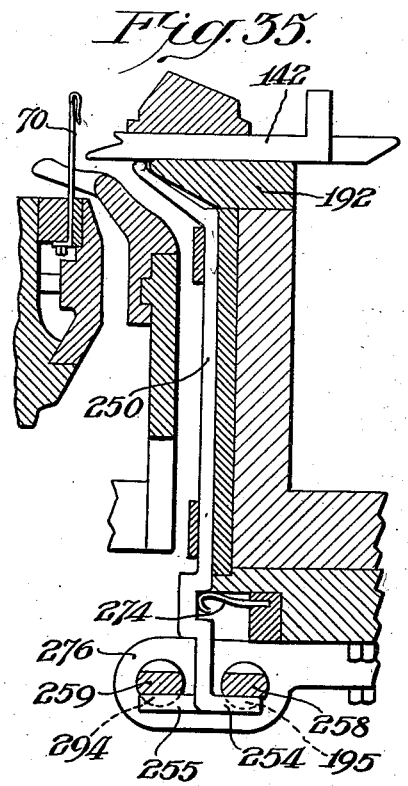
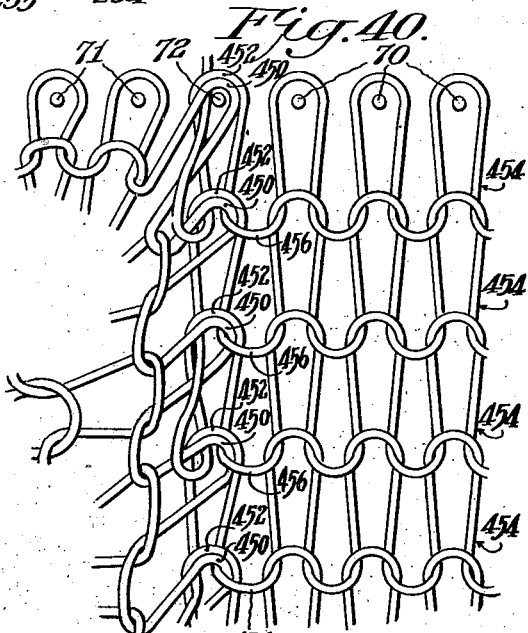
Inventor
Fritz Lambach
By William R. Smith
Attorney Jan. 2, 1945.  F. LAMBACH  2,366,340
METHOD AND MACHINE FOR MAKING HOSIERY
Filed March 16, 1939  17 Sheets-Sheet 15
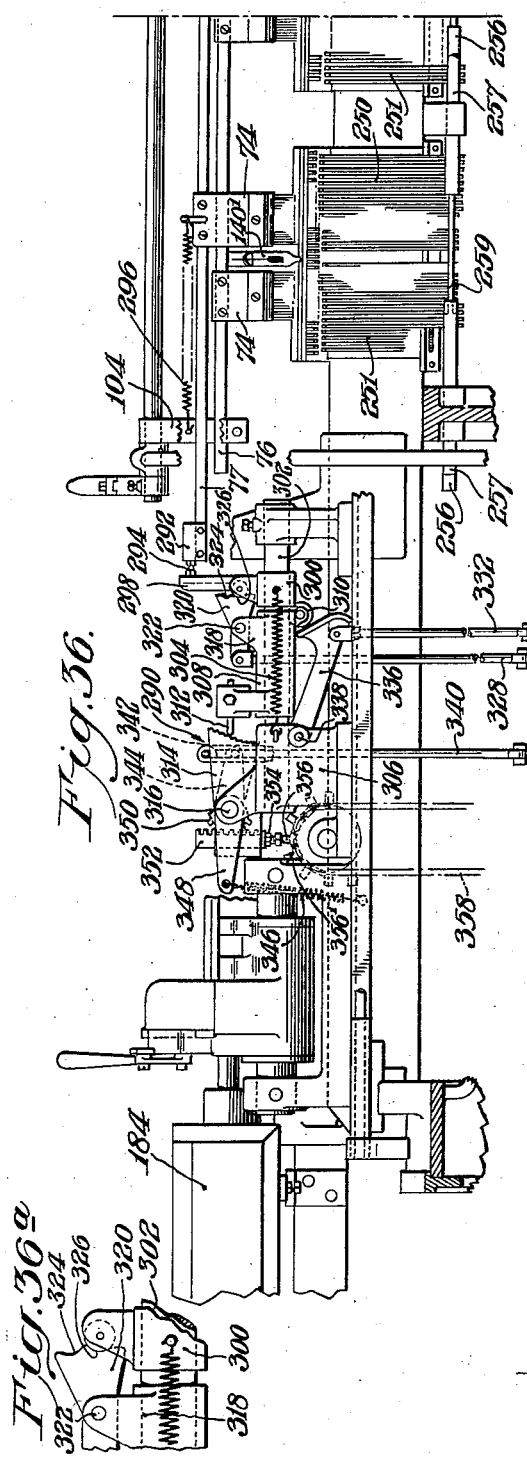
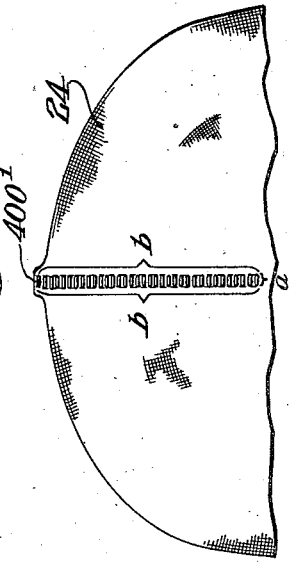
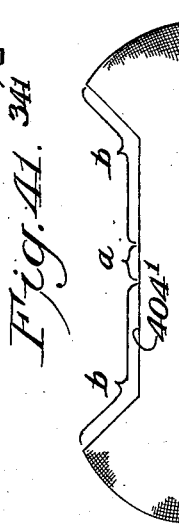
Inventor
Fritz Lambach
By William R. Smith
Attorney.

Jan. 2, 1945.  F. LAMBACH  2,366,340
METHOD AND MACHINE FOR MAKING HOSIERY
Filed March 16, 1939  17 Sheets-Sheet 16
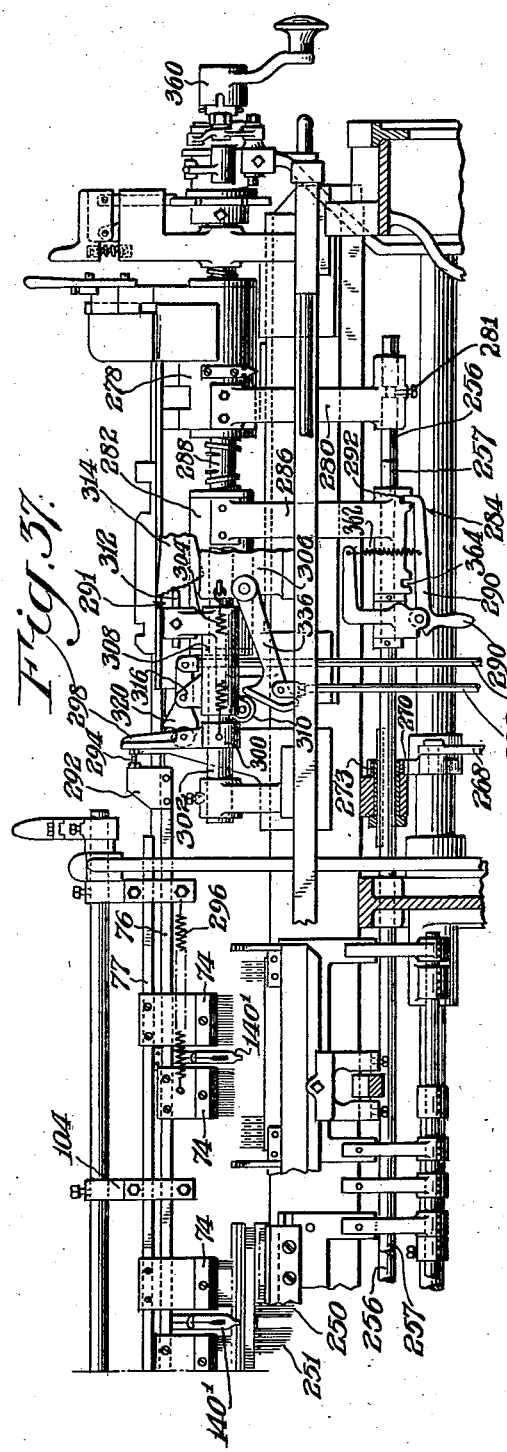
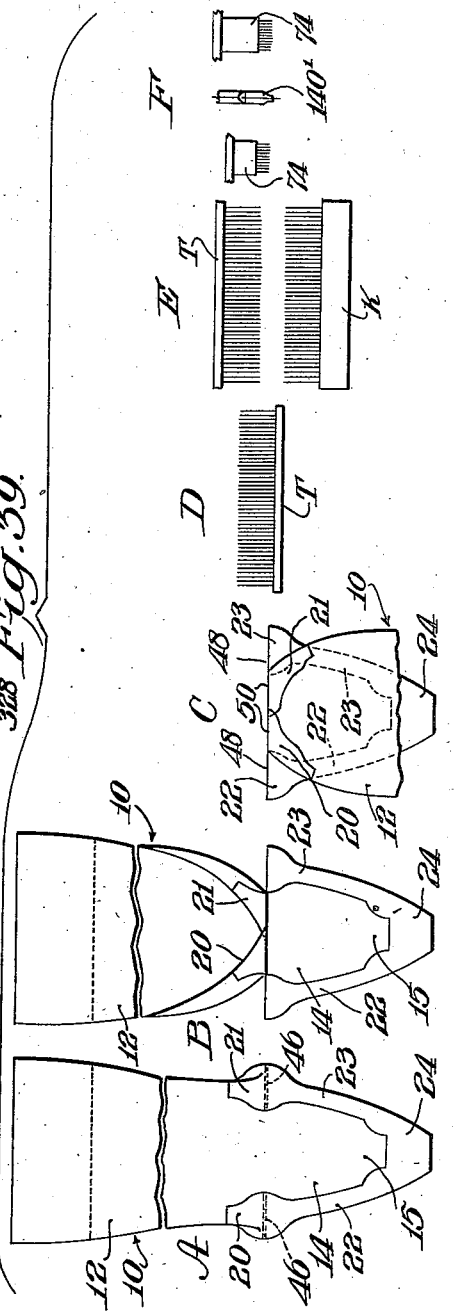
Inventor
Fritz Lambach
By William R. Smith
Attorney

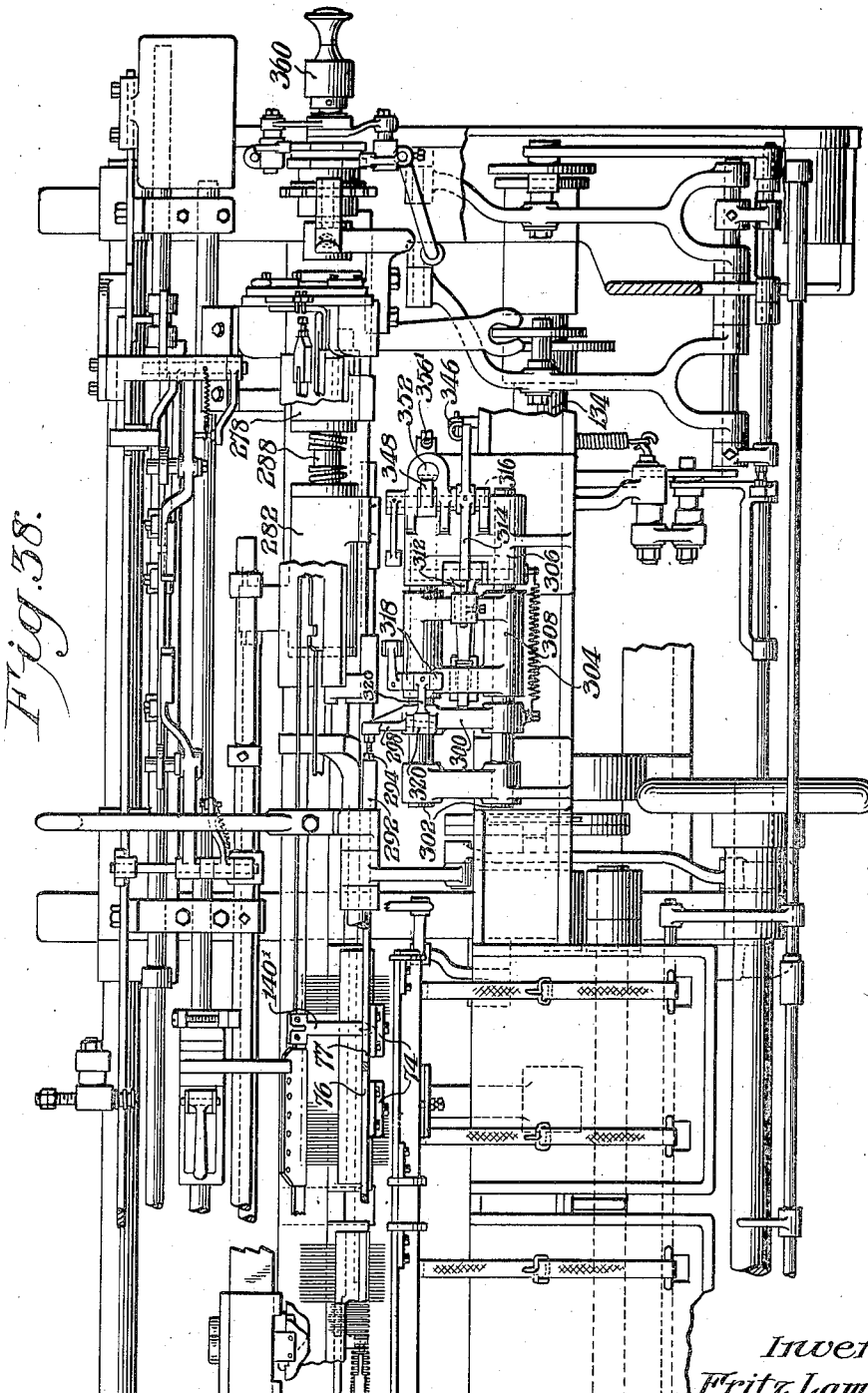

Patented Jan. 2, 1945

2,366,340

UNITED STATES PATENT OFFICE 2,366,340

METHOD AND MACHINE FOR MAKING HOSIERY

Fritz Lambach, Tenafly, N. J.

Application March 16, 1939, Serial No. 262,265
In Germany March 26, 1938

52 Claims. (Cl. 66—82)

The present invention generally relates to the art of knitting hosiery, more particularly to a full-fashioned stocking of improved construction and to a method and machine for making the same, and essentially pertains to the manufacture of a knitted stocking consisting of a unitary combination leg and foot fabric and a heel fabric interknitted therein.

There has recently been developed a method of manufacturing stockings of the type above referred to, whereby heel tabs are knitted directly onto, and as continuations of, the high heel portions of a combination leg and foot stocking blank, and the sole portions of said blank are interknitted with said heel tabs as the knitting thereof progresses. This method is realized by placing the loops of the last course of the high heel portions onto relatively spaced end groups of knitting needles of a needle row, and placing the loops of the first course of the sole portions onto middle groups of non-knitting needles arranged intermediately of said series of knitting needles, and successively transferring the loops from the non-knitting needles outwardly onto the selvedge loops of said heel tab courses, thus forming an overlapping interknitted connection therebetween.

The merit of this known method principally lies in the fact that it may be carried out on existing known machines without necessitating material changes in the basic construction thereof. In the manufacture of hosiery, it is sometimes desirable, and often necessary, to make the sole portions considerably wider than the first row of loops of the high heel portions of the stocking. It has been found, however, that, according to said known method, it is impossible to manufacture such stockings. As long as the sole portions do not exceed a certain definite width, then the method referred to is practical, but as soon as that definite width is exceeded, the method becomes impractical because it would require the use of redesigned machines for, in existing machines, there is not sufficient space between the series of knitting needles to accommodate the entire increased width of the first row of loops of each sole portion.

Therefore, it is an important object of the present invention to provide a method of knitting stockings in the manner hereinbefore mentioned, whereby the first row of sole loops may be made of a relatively greater length than the rows of high heel loops.

According to the invention, the two high heel portions separated from the sole portions are folded inwardly and placed side by side on the middle group of needles, and the two sole portions are positioned on the end groups of needles so that, in the knitting of the heel fabrics, the sole loops are transferred from the outside towards the inside instead of from the inside towards the outside, as previously done. Since the width of the heel fabric never exceeds a certain predetermined dimension, there is always sufficient space between the needles serving as selvedge needles of the middle group to top the entire width of the high heel portions side by side.

It is also one of the most important objects of the invention to provide a stocking of the type referred to consisting of a combination leg and foot fabric and a one piece flat knitted fashioned heel fabric interknitted with said blank, thus eliminating the presence of a seam in the heel, which imparts a distinctive appearance to the stocking and renders the same more comfortable to wear.

Another important object of the invention resides in the provision of a stocking consisting of a full-fashioned combination leg and foot blank and a one-piece fashioned heel fabric interknitted therein, the free loops at the bottom of said heel fabric being interknitted in a novel manner on a knitting machine, thereby eliminating the relatively thick looped connection usually found at that point in ordinary knitted full-fashioned stockings which not only assures wearing comfort, but also reduces the production cost in that the heel looping operation is dispensed with, the connection being produced in one operation with the knitting of the heel fabric.

The invention is moreover characterized by the provision of a stocking wherein the free loops at the tip of the toe portion, as well as the free loops at the bottom of the heel fabric, are united by knitting relatively narrow strips of fabric on a knitting machine, and during the knitting of such strips, interknitting therewith said free loops, accordingly producing a stocking without connections requiring extra looping operations.

According to the present invention, in the knitting of the leg and foot fabrics in one operation, it is immaterial if the connection between the last high heel and the first sole course (which is of greater width than the last high heel course of the completed stocking) is made by means of raveled courses or by means of so-called cutting courses. If cutting courses are provided, the first row of loops of each sole portion becomes wider than the last row of loops of each high heel portion in the finished stocking, and during the knitting of the high heel portions, additional loops are formed on the outside courses of the high heel to gradually increase the widths thereof until the same widths as the sole portions are obtained. In this manner, the original selvedge of each high heel portion is maintained by means of selvedge loops so that the added courses along the selvedge of the high heel portions, as well as the cutting courses between the high heel and sole portions, may be removed without destroying the original fabric of the high heel portions, the high heel and sole portions being then placed on the needles of the knitting machine for the knitting on and interknitting of the heel fabric.

In order to accomplish the manufacture of a stocking according to this invention on a flat Coulier knitting machine, provisions are made to disengage the needles in such a way that only the outer needles are rendered inactive while the center needles remain active. For example, the presser edge of the knitting machine may be made in at least three separate sections moving at different times so that the intermediate section may engage the needles opposite thereto and the other sections disengage the needles opposite thereto. In this way, the heel fabric being knitted on the active needles is knitted onto the high heel portions and the first row of loops of each sole portion in engagement with the inactive needles is transferred to the selvedge needles or to the needles adjacent to the selvedge needles.

When the two high heel portions are placed on the knitting needles either in close or overlapping relationship, and a one-piece heel fabric is to be knitted on, then in order to narrow the heel fabric the first row of loops of each sole portion must be transferred towards the center for the number of needles necessary to effect the narrowing. For that reason, certain of the intermediate needles must be used as selvedge needles on which the sole portions are transferred for the purpose of interknitting them with the heel fabric. According to the invention, the needles used as selvedge needles are operatively controlled by means of mechanisms functioning automatically during operation of the knitting machine. A preferred construction of the knitting machine to accomplish this result comprises a row of vertically movable presser fingers which may be brought relatively into either inactive position or active position by means of specially devised control mechanism. For this purpose, the control mechanism has two displaceable elements, one controlling the left half and the other the right half of the presser edge during operation of the machine.

Further, when knitting a single piece heel fabric in the manner mentioned onto the two high heel portions and when narrowing the heel fabric, the loops of the first course of each sole portion are transferred towards the center for the required number of needles and, according to this invention, only one pair of narrowing combs is employed, one narrowing comb working over the left half of the knitting section and the other narrowing comb working over the right half of the knitting section. Each comb then serves, according to the particular work of the knitting machine, either to transfer the sole loops only, or to transfer the sole loops and simultaneously narrow the heel fabric. This selective operation of the loop transfer mechanism requires a greater flexibility in the operation of the narrowing combs and, for that purpose, according to this invention, there is provided a mechanism which may be controlled from the main cam shaft of the machine, through which the narrowing combs are brought into a greater number of different positions and from these positions may be moved back and forth to narrow over the desired number of needles in addition to transfer the sole loops, or only to transfer the sole loops.

Other characteristic features of the invention will appear from the following description based upon the accompanying drawings, in which:

Figure 1 is an elevation of one form of stocking blank constructed in accordance with the invention;

Figure 2 is a perspective of the lower portion of a completed stocking made from the blank shown in Figure 1;

Figure 3 is an elevation of another form of stocking blank constructed in accordance with the invention;

Figure 4 is a perspective of the lower portion of a completed stocking made from the blank shown in Figure 3;

Figure 5 is a perspective of the lower portion of a completed stocking constructed from a blank similar to that shown in Figure 1 with slight modifications;

Figure 6 is an elevation of a part of a stocking blank with combination leg and foot fabric and a one-piece fashioned heel fabric, with open heel bottom and toe tip;

Figure 7 is an elevation of a combination leg and foot blank constructed in accordance with the invention;

Figure 8 is an enlarged diagrammatic view of a portion of the combination blank shown in Figure 7, illustrating the connection between the leg and foot fabrics;

Figure 17:
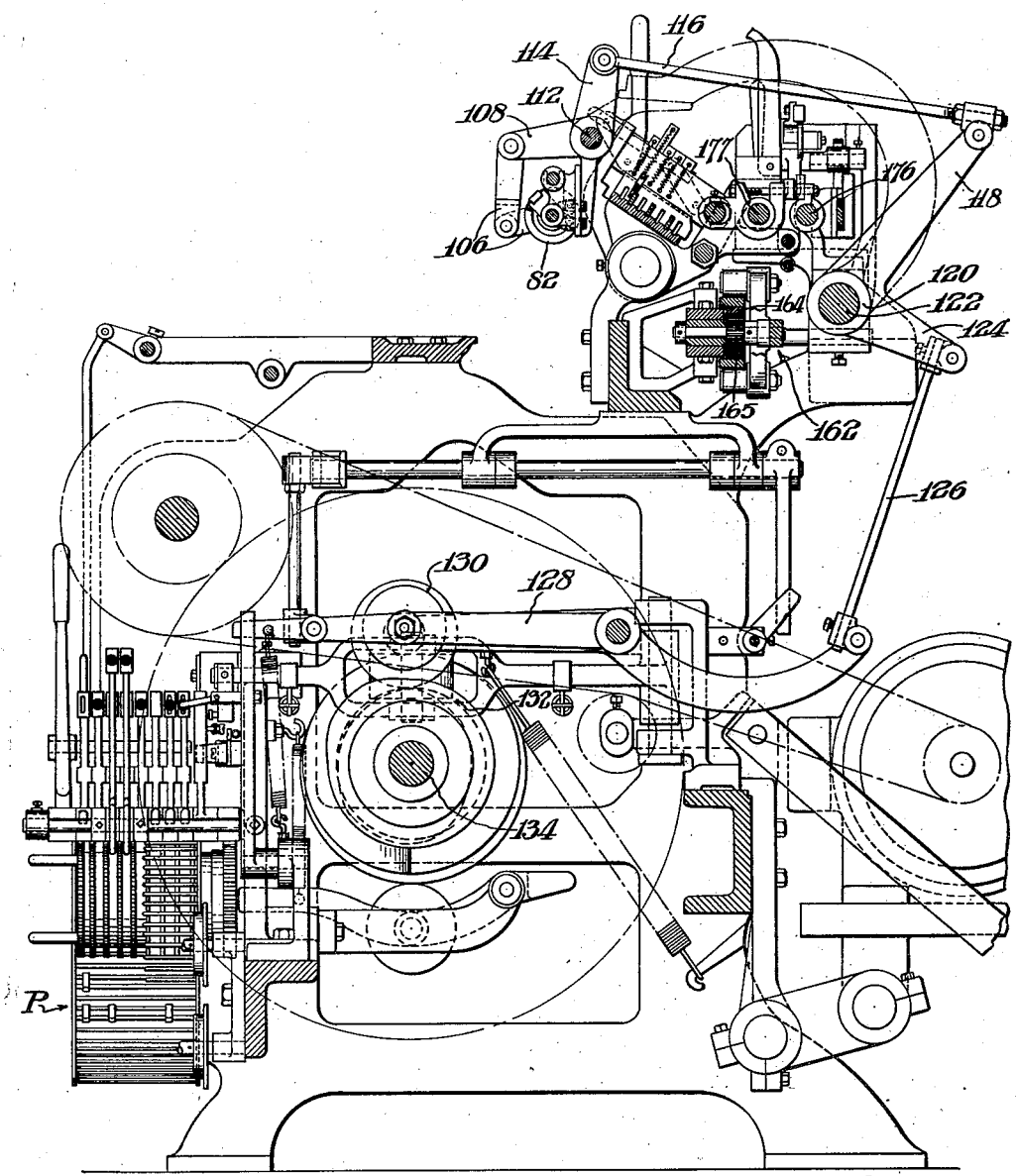

Figure 9 diagrammatically illustrates the cut combination blank and the position of the high heel portions for the knitting of separate heel tabs thereonto;

Figure 10 diagrammatically illustrates the cut combination blank and the position of the high heel portions for the knitting of a one-piece fashioned heel fabric;

Figure 11 is a front elevation of a portion of the knitting machine built in accordance with the invention for the knitting of separate heel tabs onto the heel portions, and interknitting the sole portions with said heel tabs during the knitting thereof;

Figure 12 is an enlarged diagrammatic representation of the relative position of the loops during operation of the machine shown in Figure 11;

Figure 13 is a face elevation of a portion of a combination leg and foot stocking blank with the heel tabs inserted therein;

Figure 14 is a transversal section through one portion of the knitting machine intended for the knitting of separate heel tabs;

Figure 14a is a diagrammatic representation of a modified form of presser edge;

Figure 15 is an enlarged detail in cross section of certain parts of the machine illustrated in Figure 14;

Figure 16 is a detail of the chain operated mechanism for the control of certain machine parts represented in Figure 14;

Figure 17 is a transversal section through another portion of the machine for knitting separate heel tabs;

Figure 18 is a front elevation of one end of the machine for knitting separate heel tabs;

Figure 19 is an enlarged detail in front elevation of a portion of the machine illustrated in Figure 18;

Figure 20 is an enlarged cross sectional detail of the portion of the mechanism shown in Figure 19;

Figure 21 is a section taken on line 21—21 of Figure 20;

Figure 22 is a rear elevation of the machine for knitting separate heel tabs illustrating the Coullier motion and associated elements;

Figure 23 is an enlarged detail in top plan illustrating the operative connection between the friction rods;

Figure 24 is an enlarged section taken on line 24—24 of Figure 22;

Figure 25 is a front elevation of a portion of the knitting machine built in accordance with the invention for knitting a one-piece fashioned heel fabric onto a combination leg and foot stocking blank;

Figure 26 is a diagrammatic representation illustrating the relative position of the loops during operation of the machine as shown in Figure 25;

Figure 27 is a view similar to Figure 25 illustrating the position of the parts at the finish of the heel fabric;

Figure 28 diagrammatically illustrates the position of the loops during the knitting and narrowing of a one-piece heel fabric for shaping the same;

Figure 29 is an elevation of the machine parts illustrating their relative position during the formation of the knitted connection of the free loops at the heel bottom;

Figure 30 is a diagrammatic representation of the position of the loops during operation of the machine parts as shown in Figure 29;

Figure 31 diagrammatically illustrates the overlapping of adjacent edge loops of two high heel portions and the interknitting thereof with the heel fabric;

Figure 32 is a front elevation of the machine parts illustrating the knitting of a connection between the edge loops at the tip of the toe;

Figure 33 is an enlarged transversal section through a portion of the machine constructed for the knitting of a one-piece fashioned heel fabric onto the combination leg and foot stocking blank;

Figure 34 is a detail in elevation illustrating the control of the presser fingers;

Figure 35 is an enlarged cross sectional detail through a knitting section of the machine illustrating a presser finger in operative position;

Figure 36 is an enlarged detail of the transfer wedge and associated parts;

Figure 37 is an elevation of the other end of the machine, as shown in Figure 36;

Figure 38 is a top plan of that end of the machine shown in Figure 37;

Figure 39 diagrammatically illustrates the essential successive steps of the method followed for the knitting of a one-piece fashioned heel fabric into a combination leg and foot stocking blank;

Figure 40 is an enlarged diagrammatic illustration of the overlapping of the knitted seam between the adjoining portions of the stocking;

Figures 41 to 43 inclusive diagrammatically illustrate the essential steps of the method followed in the formation of a knitted connection at the tip of the toe.

Forms of stockings

Referring more particularly to Figure 1 and 2, illustrating one form of stocking constructed in accordance with the invention, there is shown in Figure 1 a stocking blank 10 comprising a leg fabric 12, a foot fabric 14, and a heel fabric 16. The leg fabric includes the welt 18, the high heel portions 20 and 21; the foot fabric includes the instep 15, the sole portions 22 and 23, and the toe 24; and the heel fabric consists of a single flat knitted fashioned piece which is knitted onto, and as a continuation of, the high heel portions 20 and 21 of the leg fabric 12, as indicated by the dotted lines A, and interknitted to the sole portions 22 and 23 of the foot fabric 14, as indicated by the dash and dot lines B.

The heel bottom and toe tip, which are normally open due to the shaping thereof, are closed by the interknitting of their edges with knitted seams 26 and 28 respectively. The stocking is completed by sewing the selvedges 30 and 31 of the welt 18, the selvedges 32 and 33 of the leg fabric 12, the selvedges 34 and 35 of the high heel portions 20 and 21, and the selvedges 36 and 37 of the sole portions 22 and 23 to form the rear seam and the sole seam 38 and 40 respectively (Figure 2).

In Figures 3 and 4, there is illustrated another form of stocking made in accordance with the invention. In this form, the stocking also consists of a stocking blank 10 comprising the leg fabric 12, foot fabric 14 and heel fabric 16'. Like in the blank of the stocking form illustrated in Figure 1, the leg fabric includes the welt 18 and high heel portions 20 and 21, and the foot fabric includes the instep 15, the sole portions 22 and 23, and the toe 24, but the heel fabric, instead of consisting of a single piece, is made up of a pair of separated heel tabs 42 and 43, one heel tab 42 being knitted as a continuation of one high heel portion 20, and interknitted with the corresponding sole portion 22, and the other heel tab 43 being knitted as a continuation of the remaining high heel portion 21 and interknitted with the corresponding sole portion 23, as indicated at A' and B'. The bottoms of the heel tabs are interconnected by the interknitting of their edges with the knitted seam 26, and the toe tip is closed likewise by the interknitting of its edges with the knitted seam 28.

The stocking is completed by sewing the selvedges 30 and 31 of the welt, the selvedges 32 and 33 of the leg fabric, the selvedges 34 and 35 of the high heel portions, and the selvedges 44 and 45 of the heel tabs to form the rear seam 38 extending into the heel fabric 16', as indicated at 38' in Figure 4. The selvedges 36 and 37 of the sole portions 22 and 23 are also sewed to form the sole seam 40.

In Figure 5, there is shown a modification of the construction of the stocking form illustrated in Figure 2. In this modified form of the stocking, the heel bottom and toe tip which, as hereinbefore stated, are normally open, are closed by means of the well known looping operations to form the looped seam 26' and 28'.

Stocking blank

In accordance with the present invention, each of the various forms of stockings hereinbefore described is made from a combination leg and foot blank preferably of the type shown in Figure 7. The entire combination leg and foot blank as shown in Figure 7 is knitted in a single continuous operation on a suitable well known full-fashioned knitting machine and includes the leg fabric 12 and foot fabric 14, the toe 24, the high heel portions 20 and 21 and the sole portions 22 and 23. The high heel and sole portions are connected with each other either by ravel courses or cutting courses which may be removed without destroying the stocking fabric. In the example illustrated, it is assumed that the last course of each high heel portion is connected through cutting courses 46 with the first course of each sole portion.

As will appear from Figure 7, the width W of each sole portion is greater than the width W' of the associated high heel portion. As more clearly shown in Figure 8, in order to make such a connection possible, by means of cutting courses 46, and permit the removal thereof without destroying the stocking fabric in spite of the difference in the length of the last high heel course 48 and the first sole course 50, the courses of the high heel 20 are gradually brought, during knitting, to the length of the first sole course 50 by means of extra loops 52. During the knitting of the high heel portions, selvedged loops 54 are formed at the particular points where the width of each high heel portion in the finished stocking is to end. When the high heel portions are knitted with reinforcing yarns (as shown in heavy lines in Figure 8), the reinforcing yarn is laid only as far as the selvedged loops 54 while the remaining loops 52 of the high heel courses, as well as the cutting courses 46, are knitted with the main or body yarns only (as shown in light lines in Figure 8).

Where the cutting courses 46 join the leg and foot fabrics, selvedged loops 56 are formed so that, as hereinafter described, the extra loops 52, as well as the cutting courses 46, may be removed without destroying the actual stocking fabric. It will be understood that the extra loops 52, as well as the cutting courses 46, may be knitted of yarns different and separate from the yarn which is used in the knitting of the blank itself.

*Positioning of stocking blank on knitting machine*

After the stocking blank has been knitted in the manner mentioned, it is preferably topped onto relatively movable topping point sections of a special topping stand, in order to facilitate the removal of the cutting courses 46 and extra loops 52 and then to bring the last course 48 of each high heel portion, as well as the selvedged loops 56 adjoining the cutting courses 46 in a line with the first course 50 of each sole portion. The sole portions and high heel portions are transferred in this position to the knitting machine for the purpose of knitting on, and the interknitting of, the heel proper. In other words, according to the present invention, the combination leg and foot blank is cut along the cutting courses 46 and along the outer selvedged loops 54 of the high heel portions by means of a suitable implement, such as a cutting blade 60 (Figure 8), and the two high heel portions 20 and 21 and sole portions 22 and 23 are transferred to the knitting machine in the position illustrated in the drawings, that is, with said high heel portions laying inwardly, side by side, and said sole portions laying outwardly away from each other, the edge loops of the opposed high heel portions being either relatively spaced from each other, as represented in Figure 9, or arranged in overlapping relation, as represented in Figure 10.

*Knitting of separated heel tabs*

In the form of the invention shown in Figures 9 and 11 to 24 inclusive, the last course 48 of each high heel portion and the first course 50 of each sole portion are brought onto the needles 70 and 71 respectively arranged in a knitting section of the knitting machine in such a way that the two high heel portions 20 and 21 lie towards the inside and the two sole portions 22 and 23 lie towards the outside of said section, with the selvedged loops of the high heel portions spaced from each other as shown at S (Figures 9 and 11). When the heel tabs 42 and 43 are knitted onto the high heel portions 20 and 21, as more clearly shown in Figure 12, the loops of the first course 50 of each sole portion are transferred successively to the selvedge knitting needles 72 in order to interknit each sole portion with the adjoining heel tab. The knitting needles 70 and 72, which are adapted to knit the heel tabs, must be activated in a manner to be described hereinafter while the needles 71 on which the loops of the first course 50 of each sole portion are placed in order to effect the transfer on the selvedge needles 72, must be rendered inactive also in a manner to be subsequently described.

The transferring of the first courses 50 of the sole portions is accomplished by means of two relatively large narrowing combs 74 respectively mounted on separate narrowing bars 76 and 77 and operable downwardly and inwardly, while the narrowing of the heel tabs 42 and 43 is done by the downward and inward operation of two relatively small narrowing combs 78 respectively mounted on separate narrowing bars 79 and 80.

The narrowing combs 74 and 78 are intended to operate independently and, for that purpose, two separate and distinct mechanisms are utilized. One mechanism, which may be the usual known narrowing mechanism, is operatively associated with the narrowing bars 79 and 80 to impart a longitudinal sliding movement thereto with the function of the knitting machine during a narrowing cycle thereof, while the other mechanism intended to control the loop transfer mechanism, is associated with the bars 76 and 77 to impart likewise a longitudinal reciprocating movement thereto.

As more clearly shown in Figures 19, 20, and 21, the transfer motion mechanism comprising a cam disc 82 having camming faces 84 on both of its sides and mounted for oscillation on a shaft 86 suitably fixed in brackets 88. Disposed for riding engagement with the camming faces of the cam disc 82 is a pair of fingers 90 carried by sleeves 92 slidably mounted on the shaft 86, each sleeve being provided with a forked extension 94 engaging a second shaft 96 also suitably fixed in the supporting brackets 88 and adapted to guide said sleeves in their sliding movement.

The sleeves are further provided with projections 98 engageable with adjustable stop elements 100, one of said elements being secured to the transfer bar 76 and the other element being secured to the transfer bar 77. The fingers 90 are constantly urged into riding engagement with the camming faces of the cam disc 82 by means of springs 102 conveniently connected to the bars 76 and 77 and to parts of their supporting structures, such as brackets 104. The cam disc 82 is actuated by means of a link arrangement consisting of pivoted levers 106 connected to an arm 108 of a sleeve 110 rotatable on the transfer mechanism supporting shaft 112. The sleeve 110 is formed with a second arm 114 connected to a rod 116, in turn connected (as shown in Figure 17) to one arm 118 of a bell crank lever 120 arranged for oscillation on the back narrowing shaft 122 of the machine frame.

The other arm 124 of the bell crank lever 120 is attached to a rod 126 pivoted to a rocking lever 128 carrying a roller 130 disposed for coaction with a pattern cam 132 on the main cam shaft 134 of the knitting machine.

Because of this construction, it will be understood that, upon oscillation of the cam disc 82, the transfer bars 76 and 77 will be caused to move in opposite directions, as indicated in Figure 19.

As will more clearly appear from Figure 11, the heel tabs 42 and 43 are knitted from separate yarns fed by two oppositely moving yarn carriers 140 adapted to be limited in their yarn laying movements by means of carrier nuts usually provided on ordinary knitting machines.

When the thread carriers 140 are moved towards each other, the sinkers 142 (Figure 12) must also be correspondingly moved forwardly in opposite directions. The movement of the sinkers is imparted in a manner which is well known by means of slur cocks and jacks. To move the sinkers 142 forwardly in opposite directions, two slur cocks 144 and 145 are provided, which slur cocks are adapted to move towards and away from each other. In order that the two slur cocks 144 and 145 will not interfere with one another in their respective movements, especially when the measurements of the high heel portions of the stocking are such that the space S becomes relatively narrow, and also in order that the slur cock 145 operating in the right half of the knitting section will act on the jacks 146 of the right half but not the jacks 147 of the left half of the knitting section and, inversely, the left slur cock 144 will act upon the jacks 147 and not upon the jacks 146, the following arrangement is provided:

The slur cocks 144 and 145 are arranged in two superposed planes, and the jacks at the right and left halves of the knitting section are provided with cams 148 and 149 and recesses 150 and 151 respectively lying in different planes. The cams 148 of the jacks 146 in the right half of the knitting section, and the recesses 151 of the jacks 147 in the left half of the knitting section, lie in the same plane as the slur cock 145 so that said slur cock 145 passes under the cams 149 and only drives the jacks in the right half of the knitting section, the jacks of the left half of said knitting section remaining inactive because of the recesses 151 which clear said slur cock 145.

Likewise, the cams 149 formed with the jacks 147 in the left half of the knitting section, and the recesses 150 of the jacks 146 in the right half of the knitting section, are arranged in the plane of the slur cock 144 so that said slur cock 144 only acts upon the jacks 147 but not on the jacks 146.

The back and forth movement of the yarn carriers 140 and slur cocks 144 and 145 is controlled through the Coulier motion mechanism of the knitting machine in the manner more clearly illustrated in Figures 22, 23, and 24.

As shown in Figure 22, the separate slur cocks 144 and 145 are respectively carried by slur cock boxes 152 and 153 individually connected to slur cock bars 154 and 155. One slur cock bar 154 is rigidly connected through a bracket 156 to the long arm 158 of the Coulier motion 160 to receive a longitudinal reciprocating movement therefrom; the remaining slur bar 155 is operatively connected to the first mentioned slur cock bar 154 by means of gearing 162 operable to transmit motion to said remaining slur cock bar 155 in a direction opposite to the slur cock bar 154, connected with the long arm 158 of the Coulier motion 160. The gearing 162, as shown in the drawings, preferably consists of a rack 164 affixed to the slur cock bar 154, a rack 165 affixed to the slur cock bar 155, and a pinion 166 supported by means of a bracket 168 suitably mounted upon the machine frame. The bracket also preferably carries rollers 170 and 171 respectively disposed to engage the slur cock bar 154 and 155 to assure proper engagement of the racks 164 and 165 with the pinion 166.

The yarn carriers 140 are respectively associated with separate carrier bars 172 and 173 which are individually connected to separate friction boxes 174 and 175 respectively mounted on separate friction rods 176 and 177. One friction rod 176 is connected by means of the bracket 156 to the long arm 158 of the Coulier motion 160 to receive longitudinal reciprocating movement therefrom. The other friction rod 177 is operatively connected to the friction rod 176 by means of gearing 178 operable to transmit motion to said rod 177 in a direction opposite to that of the rod 176. The gearing 178, as shown in the drawings, particularly Figures 22 and 23, consists of a rack 180 rigidly secured to the friction rod 176, a rack 181 rigidly secured to the friction rod 177, and a pinion 182 suitably supported between the racks 180 and 181 for engagement therewith. The gearing 178 may be enclosed in a housing 184 suitably mounted on the machine frame.

From the foregoing description of the slur and yarn feeding mechanisms, it will be appreciated that, with actuation of the Coulier motion mechanism 160, the slur cock 144 and the yarn carrier 140 associated with one of the knitting needle groups 70, and the slur cock 145 and the yarn carrier 140 associated with the other of the knitting needle groups 70, are caused to move in unison towards and away from each other, thus laying the yarns and actuating the sinkers simultaneously in opposite directions during the knitting cycles of the machine.

The mechanism whereby the needles of the knitting section are rendered active and inactive will now be described.

In the type of machine shown in Figures 11, 12, 14, and 15, the control of the knitting needles is had by means of a divided presser edge which is provided, as more clearly shown in Figure 12, with a central stationary part 186 and two outer movable parts 187 which may be moved rearwardly to render inactive the needles 71 lying opposite thereto. In one form of presser edge, the movable parts comprise series of presser fingers 188 adapted to move in and out of notches 190 cut into the presser edge plate 192. When the presser fingers 188 are in their rearward or inner position, the needles 71 opposite thereto are inactive, and when the presser fingers 188 are in their forward or outer position, so that their upper ends are in line with the forward edge of the stationary part 186, needles 70 opposite thereto are active. The presser fingers 188 are fastened in a holder 200 by means of suitable fastening elements 202, the holder being movable horizontally back and forth in a dovetailed or some other form of sliding arrangement 204. The forward end of the holder 200 is suitably connected, for instance, by means of a pin 206 arranged in a slot 208 of a lever 210 adapted for swinging motion about a pivot 212. The lower end of the swinging lever 210 is pivotally connected, as at 214, to one end of a link 216, the other end of which is pivoted as at 218 onto a rocking lever 220 oscillating about a shaft 222 supported upon the machine frame.

The lower end of the rocking lever 220 carries a stud 224 on which a roller 226 is arranged to slide horizontally. The roller 226 may be shifted in a manner to be described in detail hereinafter on the stud 224 by means of a forked lever 228. Depending upon the position of the roller 226, the same may be engaged with an active cam 230 on the main cam shaft 134 of the machine, or with a neutral cam 232 also arranged upon the main cam shaft. A draw spring 234 fastened between the lower end of the rocking lever 220 and a fixed portion of the machine frame urges the roller 226, depending upon its position, either against the active cam 230 or the neutral cam 232.

As shown in Figure 14, when the roller 226 engages the active cam 230, the sliding holder 200 is moved in the direction of the arrow R by action of the spring 234 whenever the roller 226 engages the cut off portion of the active cam 230 whereby the movable presser fingers 188 are pushed forwardly and actuate the needles in opposition thereto.

When the roller 226 is in engagement with the neutral cam 232, it is pressed into the position indicated by the broken lines (Figure 14) in opposition to the action of the draw spring 234 whereby the presser fingers 188 are brought back to the position in which the opposite needles are rendered active.

The free end of the shifting forked lever 228 is secured to a rod 236 which is suitably arranged on the machine frame for horizontal sliding movement. If, during the knitting of the heel tabs, the machine is to operate to transfer the first course of each sole portion immediately upon the knitting of the first course of the associated heel tab onto the corresponding high heel course, then the rod 236 may be operated by hand, in order to set the machine in position to effect the transfer operation. If, however, prior to the active knitting of the heel tabs, the machine is to operate to first knit a series of full courses extending over the combined widths of the high heel portions and sole portions and then transfer the loops of the sole portions for engagement with the subsequent heel tab courses, then the rod 236 is operated automatically to set the machine to effect the transfer operations at the proper time in the process of knitting.

For that purpose, the presser fingers 188 must be in their forward position to actuate the needles opposed thereto for knitting said full courses.

In order to begin the interknitting of the sole portions with the heel tabs without stopping the knitting machine after knitting of the full courses which extend over the entire combined width of the high heel and sole portions, the rod 236 is automatically displaced by means of the device shown in Figure 16 to bring the roller 226 out of engagement with the active cam 230 and into engagement with the neutral cam 232 which holds the presser fingers 188 in the rearward inactive position. As shown in Figure 16, the end of the rod 236 is connected to an oscillating cam lifter 238 movably mounted on the axis 240. The oscillating cam lifter 238 is swung about its axis 240 when, upon the forward movement of a button 242 attached to a pattern chain 244 driven by the main cam shaft of the machine, the lifter comes into engagement with said button acting on the rod 236 to slide the same, thereby causing the roller 226 to come into engagement with the neutral cam 232.

In the form shown in Figure 14a, the presser edge consists of a central fixed section 186' and two outer sections 187' bodily movable in the direction indicated by the arrow M. The length of the central fixed section 186' determines the distance between the two selvedge needles 72. Of course, it will be understood that the length of the central fixed section 186' depends upon the size of the stocking being knitted. However, the machine may be readily adapted to the knitting of stockings of various sizes merely by the interchanging of the presser edge sections in order to render more or less needles active or inactive.

The movable presser edge sections 187' may be suitably connected to the holder 200, for instance, in the same manner as the presser fingers 188, so that with operation of said holder, as hereinbefore described, the sections 187' will be moved bodily in and out of active position.

When the heel tabs have been knitted, and the stocking fabric removed from the machine, the stocking blank has the form shown in Figure 13.

*Knitting of a one-piece fashioned heel fabric*

Whereas in the form shown in Figures 9 and 11, the high heel portions 20 and 21 are placed on the needles of the knitting section in such a way that the space S exists therebetween for the purpose of knitting separated heel tabs, in the form shown in Figures 10, 25, 26, 27, 28, and 31, the high heel portions 20 and 21 are brought onto the needles of the knitting section so that the outer edge loops of the last courses 48 are immediately adjacent one another or in overlapping relation, that is, said edge loops are engaged upon immediately adjacent needles, or upon the same needle. Because of this arrangement, a one-piece heel fabric 16 may be knitted onto and as a continuation of the two high heel portions 20 and 21 and interknitted with the sole portions 22 and 23 in the manner hereinafter described. According to this invention, and as more clearly shown in Figure 33, the one-piece heel fabric 16 is knitted with the use of one yarn carrier 140' one slur cock 144' and all the jacks 146', the slur cock 144' being in the same plane as the cam engaging portions 148' of said jacks.

It is known in the art that the heel fabric must be narrowed during knitting. As shown in Figures 27 and 28, the narrowing of the French type of heel is accomplished by narrowing the fabric inwardly. When the heel is narrowed the distance of one needle, the first course of each sole portion hanging on the inactive needles must be transferred inwardly as a whole for the distance of one needle so that the original selvedge needles to which the loops of the first course of the sole portions were transferred for the purpose of interknitting with the heel fabric, must be rendered inactive during the knitting of the succeeding heel courses. Likewise, as the narrowing of the heel progresses, the adjacent needles successively become the selvedge needles. Of course, it will be understood that if the heel fabric is narrowed two or more needles, the corresponding number of formerly active needles become inactive after each narrowing operation.

The narrowing of the heel fabric and simultaneous transferring of the first courses of the sole portions for the desired number of needles, as well as the positioning of the loops on the successive selvedge needles are accomplished by the narrowing combs 74 in the manner to be described in detail hereinafter. The relatively small narrowing combs 78 provided in the machine for knitting separate heel tabs, are disregarded in the machine for knitting a one-piece fashioned heel fabric.

The control of the needles for rendering the same active or inactive is done by means of special mechanisms more clearly shown in Figures 33 to 37 inclusive. As shown in said figures, the presser edge consists of two series of vertically movable presser fingers 250 and 251 respectively distributed over the right and left halves of the knitting section up to the center portion 252 of said presser edge, which portion is preferably made immovable for the reason to be subsequently stated. Of course, movable presser fingers may also be used instead of the stationary central portion 252 if so desired.

When the presser fingers 250 and 251 are in the lower position shown in Figure 33, they render the needles opposite thereto inactive, but when said presser fingers, as shown in Figure 35, are in the upper position, they render the associated needles active. The presser fingers 250 (Figures 34 and 37) arranged in the right half of the knitting section have on their lower ends rearwardly bent hooks 254 (Figures 33 and 35) whereas the presser fingers 251 arranged in the left half of the knitting section have on their lower ends forwardly bent hooks 255. The rearwardly bent hooks 254 are in engagement with a shifting shaft 256, whereas the forwardly bent hooks 255 are in engagement with a shifting shaft 257. Both shifting shafts are provided with flattened portions 258 and 259 respectively which may be oscillated at an angle of approximately ninety degrees. This oscillation occurs during one revolution of the main cam shaft 134 by means of the following arrangement:

On the main cam shaft 134 is fastened a cam 260 cooperatively associated with a roller 262 carried by a rocking lever 264, which lever is urged towards the cam 260 by means of a draw spring 266. Pivoted on the oscillating lever 260 as at 267 is a link 268 which oscillates back and forth with a gear segment 270 attached thereon. The gear segment engages a gear wheel 272 fastened on the shifting shaft 256 and enmeshed with a gear wheel 273 fastened on the shifting shaft 257 so that with every revolution of the main cam shaft 134, the two shifting shafts 256 and 257 are oscillated on an angle of approximately ninety degrees.

The presser fingers 250 and 251 respectively which, upon oscillation of the shifting shafts 256 and 257, are situated with their hooks over the round portion of the shafts, remain unchanged in their lower inactive position. However, the presser fingers, which during the oscillation of the shifting shafts 256 and 257 have their hooks in engagement with the flattened portions 258 and 259 of said shifting shafts, are pressed upwardly into active position by means of springs 274 as soon as the flattened portions 258 and 259 come into horizontal position shown in Figure 35.

When the shifting shafts are again oscillated back so that the flattened portions thereof come into the vertical position shown in Figure 33, the presser fingers are again drawn into their lower inactive position. In order to automatically change the number of presser fingers which are to remain in the inactive position, or which should be brought into active position during the operation of the machine, the following arrangement is used:

The two shifting shafts 256 and 257 are shiftable lengthwise in bearings 276 suitably secured on the machine frame. The end of the shifting shaft 256, as shown in Fig. 37, is positively connected with one carrier nut 278 through the medium of a bracket 280; for this purpose, the end of the shifting shaft 256 rotatably arranged in a bearing of the bracket 280 is provided with a groove for engagement with the end of a set screw 281. The end of the other shifting shaft 257 is connected to the remaining carrier nut 282 by means of a disengageable coupling 284 formed with a bracket 286 secured onto said nut 282. The carrier nuts 278 and 282 are mounted on a double threaded spindle 288 operating to variably limit the distance of travel of the yarn carrier 140' in accordance with the narrowing of the heel fabric during the operation of the machine.

When, as shown in Figure 37, the latch 290 of the disengageable coupling 284 is engaged in the notch 292 on the bracket 286, both shifting shafts 256 and 257 are moved towards each other a distance corresponding to the shifting of the carrier nuts 278 and 282, that is, as clearly shown in Figure 34, the shoulder 294 of the shaft 257 moves inwardly between the full and flattened portions of the shifting shaft 256 whereas the shoulder 295 of the shaft 256 is shifted in the opposite direction between the full and flattened portions of the shifting shaft 257. As a result, a progressively lesser number of presser fingers 250 and 251 come into engagement with the flattened portions of the shifting shafts as the carrier nuts 278 and 282 move towards one another; accordingly a greater number of presser fingers assume an inactive position.

As hereinbefore mentioned, the narrowing combs 74 in the type of machine intended to knit a one-piece fashioned heel fabric, must accomplish the transferring of the sole loops onto the selvedge knitting needles and also perform the narrowing of the heel fabric simultaneously with the transfer of the sole loops for the required number of needles. Furthermore, as will be set forth hereinafter, the narrowing combs 74 must, at times, be brought to the position shown in Figure 29. In other words, the narrowing combs must be capable of adjustment—first, to the position shown in Figure 25, from which position said combs can accomplish the transfer of the first courses of the sole portions one or more needles; second, to the position shown in Figure 27 from which position the combs accomplish the narrowing of the heel fabric and the transferring of the first courses of sole portions as a whole over one or more needles; and finally, to the position shown in Figure 29 in which the combs accomplish the transfer of the loops by one needle for the purpose to be more fully described hereinafter.

In order that the adjustments of the narrowing combs in their various positions may be done automatically during the operation of the machine, the narrowing combs are coupled with mechanisms operated from the main cam shaft 134 which mechanisms, in the embodiment shown, have the form of so-called clock tackles. As will clearly appear from Figures 36 and 37, the narrowing combs 74 carried by the narrowing bar 77 and working in the right half of the knitting sections are operated from a tackle 290 arranged on the left half of the knitting machine (Figure 36), and those narrowing combs 74 carried by the narrowing bar 76 and working in the left half of the knitting sections are operated by a tackle 291 arranged on the right side of the machine (Figure 37).

The mechanisms operate as follows: The right and left narrowing combs 74 are, as previously stated, respectively fastened to narrowing bars 76 and 77 slidably supported in brackets 104 of the machine frame. The end of each bar 76 and 77 is provided with an extension 292 having an adjustable stop 294. Each bar 76 and 77 with the corresponding adjustable stop 294 is urged by means of a spring 296 against an actuating plate 298. This actuating plate 298 is immovably mounted onto a body 300 which, in turn, is horizontally slidable on two paralleling rods 302 supported upon the machine frame. A spring 304 fastened to a fixed part 306 of the knitting machine draws the body 300 against the main body 308 which has on its lower end a roller 310 and is likewise horizontally slidable on the rods 302. In order to maintain the main body 308 in its so-called original position on the rods 302, said main body is provided with a stud 312 which is pressed against a stepped segment 314 upon being brought against the body 300 by the draw spring 304. The stepped segment is keyed on the shaft 316 and is adapted to be oscillated therewith. The adjustment of the stepped segment 314, that is, the particular step against which the stud 312 is pressed by the draw spring 304, determines the original position of the main body 308 and consequently the position of the narrowing combs 74.

The main body 308 has an extension 318 in which a transfer wedge 320 is rotatably mounted on a stub 322. The transfer wedge is formed with a suitable cut-out edge 324 cooperating with a roller 326 fastened to the body 300. During the operation of the machine, the transfer wedge 320 is oscillated back and forth about the stub 322 by means of a link and lever arrangement 328 controlled by a cam 330 on the main cam shaft 134.

Depending upon the position of the transfer wedge 320, the required step thereof comes into engagement with the roller 326 so that the transfer wedge pushes the body 300 and the plate 298 against the action of the spring 304 thereby causing the narrowing combs 74 to move over one or more needles. The cut-out edge 324 of the transfer wedge 320 is so shaped as to impart to the narrowing combs the required movement over the desired number of needles; in other words, the greater the dip of the edge 324, the greater the movement of the narrowing combs.

When the control arrangement 328 brings the transfer wedge 320 back to its starting position, the spring 304 draws the body 300 against the main body 308 which is constantly held in the original position by means of the stud 312 and the stepped segment 314. The narrowing combs 74 follow this latter movement of the body 300 and plate 298 because of the spring 296 so that said narrowing combs are again brought to their original position where they remain until the next narrowing or transferring operation.

If the original position of the narrowing combs 74 is to be changed this may be accomplished in the following manner: a link and lever arrangement 332 is actuated from a cam 334 on the main cam shaft 134 of the machine whereby a shifting segment 336 is swung upwardly about a pivot 338 attached to the fixed part 306 and brought into engagement with the roller 310 carried by the main body 308. In this manner, the main body 308, together with the body 300 are shifted against the action of the draw spring 304 by means of the shifting segment 336 which acts on the roller 310 so that the stud 312 comes out of engagement with the stepped segment 314. Then the stepped segment 314 is actuated by means of a link and lever arrangement 340 controlled from a cam 341 on the main cam shaft 134 of the machine. The actuation of the stepped segment 314 takes place after overcoming the play in a sliding slotted connection 342 through the intervention of a lever 344 arranged on the stub 316 which is influenced in its direction of rotation against the action of a draw spring 346 engaging an extension 348 formed with the stepped segment 314.

Also arranged upon the stub 316 is a toothed segment 350 which actuates a rack 352 upon movement of the stepped segment 314. By this means, the adjustable end 354 of the rack 352 moves out of engagement with the button 356 of a pattern chain 358. Then the pattern chain 358 is moved one step during the subsequent operation of the knitting machine so that the next button 356' comes under the end 354 of the rack 352 whereupon the link and lever arrangement 340 moves upwardly, bringing the end 354 in contact with said button 356'.

Because of the provision of the slotted connection 342, no pressure is normally exerted on the lever 344. The stepped segment 314 keyed to the stub 316 is rotated anti-clockwise by the draw spring 346 which engages the extension 348 whereby the lever 344, likewise keyed to the stub 316, is also rotated anti-clockwise. The stepped segment 314, however, can be rotated anti-clockwise only as far as it can move the rack 352 downwardly through the toothed segment 350, likewise keyed to the shaft 316, the distance of movement being determined by the height of the buttons of the pattern chain 358.

As a result of the free action existing because of the sliding slotted connection 342 between the lever 344 and the link and lever arrangement 340 the engagement of the stepped segment 314 is not interfered with when said arrangement moves further up than said stepped segment and, therefore, the lever 344 may be rotated according to the height of the buttons on the pattern chain 358.

After the stepped segment 314 has assumed its new position, in the manner described, the link and lever arrangement 332, together with the shifting segment 336, are lowered so that the spring 304 once more pulls the body 300 and the main body 308 until the stud 312 hits the stepped segment 314.

From the foregoing, it will be understood that the height of the buttons on the pattern chain controls the position of the narrowing combs 74 since when a higher button comes under the rack end 354, the downward movement of the rack 352 is limited, the upward movement of the stepped segment 314 being limited accordingly. Therefore, the main body 308, as well as the body 300, are stopped at an advanced position so that the narrowing combs 74 also assume an advanced position from which they move back and forth by actuation of the transfer wedge 320.

The operation of the cams 330, 334, and 341 respectively acting through the link and lever arrangement 228, 332, and 340 on the transfer wedge 320, the shifting segments 332, and the stepped segment 314, is governed by the function of the usual pattern chain commonly provided on ordinary full-fashioned knitting machines and such as generally indicated at P in Figures 17 and 18 of the drawings.

To understand better the working of the knitting machine, it must be borne in mind that the following two knitting procedures are executed: Firstly, as shown in Figure 26, a heel fabric course is knitted, then the loops of the initial course of each sole portion are transferred the distance of one or more needles bringing the innermost loop of said initial course of each sole portion in engagement with the selvedge knitting needles 72; secondly, as shown in Figure 28, the heel fabric is narrowed, as indicated at N, and the loops of the initial course of each sole portion are transferred so that the innermost loop of said initial course of said sole portions engages the selvedge needles.

In order to execute the first mentioned knitting procedure, the proper button on the pattern chain 358 (Figure 36) is brought into engagement with the rack 252 so that the narrowing combs 74 become located at the position shown in Figure 25. Thereupon, the transfer wedge 320 is oscillated to bring the particular step thereof into engagement with the roller 326, which causes the narrowing combs 74 to be shifted the distance of one or more needles, whereupon the transfer wedge is returned to its starting position, the springs 296 and 304 drawing the narrowing combs back to their original position. With this back and forth movement, the narrowing combs 74 transfer inwardly the initial course of the sole loops, thereby transferring the innermost loop or loops of said initial course onto the selvedge knitting needle or needles, to effect the interknitting connection between the sole and heel fabrics, as represented in Figure 26. In order to execute the second mentioned knitting procedure, the proper button on the pattern chain 358 (Figure 36) is brought into engagement with the rack 252 so that the narrowing combs 74 are advanced to the position more clearly shown in Figure 27. Thereupon, the transfer wedge 320 is oscillated to bring the particular step thereof into engagement with the roller 326 which causes the narrowing combs to be shifted the distance of one or more needles whereupon the transfer wedge is returned to its starting position, the springs 296 and 304 drawing the narrowing combs back to their original position.

With this shifting movement, the narrowing combs 74 effect a narrowing of the heel fabric and a simultaneous transfer of the sole loops for the number of needles corresponding to the narrowing. Since, during the narrowing of the heel fabric, the adjacent series of heel loops and sole loops are transferred simultaneously over the same number of needles by the same combs 74, it will be understood that there is no overlapping of sole and heel loops at this particular function of said combs. Then the sole loops must be transferred one or more additional needles to engage the innermost loop of the first course of each sole portion with the corresponding selvedge needle 72, as shown in Figure 28.

For this purpose, the narrowing combs 74 are again brought to their original position, as shown in Figure 25, by means of the buttons 356 which are moved by the chain 358 under the rack 352, whereupon the sole loop transfer operation is repeated, as hereinbefore described.

As previously stated, the successive needles which serve as selvedge needles during the knitting of a heel fabric course become inactive after the narrowing operation. For that purpose, the two shifting shafts 256 and 257 are shifted towards each other for the required distance by the carrier nuts 278 and 282 so that, upon rotation of said shifting shafts in both halves of each knitting section, an additional presser finger in each half is held down in the inactive position, whereupon the corresponding needle becomes inactive.

In Figures 25, 26, and 27, it is assumed that the high heel portions 20 and 21 are brought on the needles of the knitting machine in such a way that their edge loops are directly adjoining each other. However, as shown at C in Figure 31, it is also possible to bring the high heel portions 20 and 21 on the needles of the knitting machine in such a way that the edge loops overlap each other, whereupon the one-piece fashioned heel fabric 16' is knitted on the high heel portions with their loops in overlapping relationship.

*Interknitted connection of heel bottom*

When the one-piece fashioned heel fabric 16 has been finished and interknitted with the sole portions 22 and 23, as shown in Figure 27, the fabric is not pressed off the needles for the purpose of looping the heel bottom, as usual, on a special looping machine, but the fabric is kept on the needles so that a relatively narrow strip 400 (Figures 29 and 30) may be knitted on in the central portion of the heel in one operation and without cutting the thread 402 whereby, according to the same principle, as mentioned for the interknitting of the loops of the initial sole courses with the selvedge loops of the heel courses, the free loops of the last heel course 404 laying on each side of said central portion are interknitted with the strip 400, said free loops being transferred to the selvedge needles 72. The strip itself may consist of two loops, as illustrated, or of any desired number of loops, for instance, four loops.

In setting the machine to knit the strip 400 in the manner described, the narrowing fingers 74 are brought out of the position shown in Figure 27 into the position shown in Figure 29 by means of the pattern chain 358 (Figure 36). Moreover, the yarn carrier 140' is brought from its extreme left position, as shown by the dotted lines in Figure 27, into the inner position shown in Figure 29.

According to the invention, it is possible to shift the yarn carrier 140' without cutting the yarn 402. Assuming that the yarn carrier 140' is at the extreme left position indicated by the dotted lines in Figure 27, then another row of loops is knitted by said yarn carrier onto the left half of the heel fabric 16 but not onto the right half thereof, that is, the presser fingers 251 in the left half of the knitting section remain in a position to actuate the needles 71 laying in opposition thereto while the presser fingers 250 of the right half of the knitting section up to the last, or the two last, presser fingers which lie opposite to the needles intended for the knitting of the strip 400, are brought into that position which renders the needles in opposition thereto inactive. Thereafter, the carrier nuts 278 and 282 are moved closer together by turning the spindle 288 by means of the hand crank 360 (Figure 35) in order to limit the travel of the yarn carrier for the purpose of knitting the narrow strip 400. In this operation, the catch 290 (Figure 37) is drawn against the action of the draw spring 362 out of the notch 292 in the bracket 286 engaging the shifting shaft 257.

When the spindle 288 is turned by means of the hand crank 360, the carrier nut 278 displaces the shifting shaft 256 to the left since such shaft is fixedly connected to the carrier nut 278 by means of the bracket 280 while the shifting shaft 257 remains in its position when the carrier nut 282 and the bracket 286 are moved to the right by the turning of said spindle 288. When the carrier nuts 278 and 282 have been moved to the required position, the catch 290 is brought into the notch 364 whereby the shifting shaft 257 is again actively coupled with the bracket 286. In this manner, the shoulder 295 of the shifting shaft 256 is moved so far to the left that all of the presser fingers 250 are held in the inactive position while the shoulder 294 of the shifting shaft 257 remains in the position whereby those presser fingers 251 which lie opposite to the needles in the left half of the knitting section are brought into the active position through the flattened portion 259 of said shifting shaft 257.

It will be understood that the same result may also be had by bringing the catch 290 immediately into the notch 364 after disengagement of said catch from the notch 292, thereby moving the shifting shaft 257 to the left. Then the spindle 288 is turned, the shifting shaft 256 shifted to the left, and the shifting shaft 257 returned to its original position, and when the thread carrier 140' has laid the thread for the knitting of another row of loops onto the left half of the heel fabric, the catch 290 is brought out of engagement with the notch 364, the shifting shaft 250 is drawn to the right by means of the handle 291, and the catch 290 is again engaged with the notch 292. Accordingly, all of the presser fingers 251 in the left half of the knitting section, with the exception of those opposed to the needles knitting the strip 400, are brought into their inactive position, and said strip may be knitted onto, and interknitted with, the heel fabric.

From the foregoing, it will be understood that the innermost needles intended to knit the strip 400 always remain active, while the remaining needles must, at times, be active and at other times inactive. It is possible, therefore, as will appear from Figure 34, to construct the central section 352 of the presser edge so as to be immovable, and to arrange the movable presser fingers 250 and 251 on both sides of said central section 340. Then the needles laying opposite the section 352 are always active.

Before the strip 400 is knitted onto the heel fabric in the manner aforesaid, it is also possible to knit one or more rows of loops onto the heel fabric from another yarn or with a yarn in addition to the heel yarn.

*Interknitted connection of separated heel tabs*

At this point, attention is called to the fact that the terminal courses of separated heel tabs knitted in the manner hereinbefore described, may be united by means of a knitted seam consisting of a knitted strip similar to the strip 400. For that purpose, the loops of said terminal courses are placed onto the needles of the knitting machine either in adjacent or overlapping relationship, whereupon said strip is knitted, the loops of the terminal courses of the heel tabs being successively transferred for interknitting with the strip in a manner identical with that set forth in the description of the interknitted connection of the one piece fashioned heel bottom.

*Interknitted connection of toe tip*

In accordance with the invention, and as shown in Figure 32, it is also possible to eliminate the looping of the end of tip of the toe. For that purpose, there is knitted into the central portion of the toe fabric 24 a relatively narrow strip 400' with which the free loops of the last or terminal toe course 404' lying on both sides of said central portion are interknitted by transferring said loops to the selvedge needles while knitting the strip 400'.

Also, the strip 400' may be knitted in one operation with the toe when producing the foot portion of the stocking blank in the same manner as described in relation to Figures 29 and 30. Furthermore, it is possible, before knitting the strip 400' onto the toe fabric, to knit on one or more rows of loops from another yarn or from a yarn in addition to the toe thread.

The completed stocking blank, provided with a toe strip 400' and a heel strip 400 has either the shape shown in Figure 1 or the shape shown in Figure 3, depending upon whether a one-piece fashioned heel fabric or a pair of separated heel tabs is knitted into the combination leg and foot blank 10.

It may be mentioned here that the toe and heel connections by means of the knitted strips may also be used with the so-called two-machine stocking method in which a stocking leg blank, including the leg, high heel, and heel tabs, is made in one operation on a first machine and then transferred to a second machine for the knitting of a foot blank including the instep, sole, and toe portions. In such a case, the toe strip may be produced in one operation with the toe. In order to knit the heel strip, the two heel tabs are brought onto the needles of the knitting machine directly adjoining each other or overlapping one another, as hereinbefore described, and then the heel strip is knitted either directly onto the heel tabs and interknitted therewith, or one or more rows of loops are previously knitted onto the heel tabs before the knitting of the strip is begun.

For economical reasons, it may be advisable, under certain conditions, to knit the leg and foot portions in one operation on suitable known types of knitting machines and then knit the heel fabric either with or without the knitted strip connection on a special heeling machine, which is equipped with the various mechanisms set forth in the foregoing description. In such a case, the machine herein shown and described would serve only as a heeler.

It is pointed out that the transfer of the loops from the inactive or non-knitting needles 71 to the selvedge needles 72 of the knitting needles 70 produces a strong and flat seam because, in the manner clearly shown in Figure 40, the transfer loops 450 from said non-knitting needles are placed in overlapping relation with the needle loops 452 of each successive course being knitted on the knitting needles, each successive needle loop 452 thus passing through the overlapped loops 450 and 452 of the preceding course so that said overlapped loops become engaged with the sinker loops 456 of said courses 454.

In Figure 39, there have been shown the essential successive steps of the method followed in the manufacture of a stocking blank in accordance with the invention.

*Step A.*—A combination leg and foot stocking blank 10 is knitted with high heel portions 20 and 21 and sole portions 22 and 23, said high heel and sole portions being united by separating courses 46.

*Step B.*—The high heel and sole portions are separated by the removal of the separating courses 46 so that said high heel portions may be brought together.

*Step C.*—The blank is folded so that the first course 48 of each sole portion and the last course 50 of each high heel portion lay on a straight line.

*Step D.*—The blank in the position shown in C is topped onto a transfer bar T.

*Step E.*—The blank is transferred from the transfer bar T to the needle bar K of the heel knitting machine.

*Step F.*—A one-piece fashioned heel fabric is knitted onto, and as a continuation of the high heel portions and the sole portions are interknitted with said heel fabric by means of the yarn carrier 140' and combs 74.

Figures 41, 42, and 43 diagrammatically illustrate the essential successive steps in knitting the fabric strip 400' on the toe fabric 24, and interknitting with said strip the loops of the terminal course 404' of said toe fabric.

As represented in said figures, the central portion *a* of the terminal course 404' is engaged with the knitting needles 70, and the side portions *b* of said terminal course 404' are engaged with the non-knitting needles 71. As the knitting of the strip on the needles 70 progresses, the loops of the side portions *b* of the terminal course are gradually transferred by means of the narrowing combs 74 so that said loops of the portions *b* become interknitted in overlapping relation with the strip 400' to close the tip of the toe fabric 24, as shown in Figure 43.

Manifestly, the various mechanisms shown and described herein are capable of several modifications and, accordingly, any modification coming within the scope of the subjoined claims is to be considered within the spirit of the invention.

What I claim is:

1. The method of knitting full-fashioned stockings which consists in knitting the leg blank and foot blank as a unitary fabric with the high heel portions of the leg blank directly interknitted with the sole portions of the foot blank; then separating the last course of each high heel portion from the first course of its associated sole portion and folding the high heel portions towards each other to arrange the last courses thereof in a straight line abutting relation with each other and in a straight line relation with the first courses of the sole portions; placing all of said courses on the needles of a full-fashioned hosiery knitting machine with the end loops of the high heel course contiguous to each other and knitting continuous courses across both high heel portions and, simultaneously therewith, interknitting loops of the sole courses with loops of the continuous courses knitted to the high heel portions.

2. The method of knitting full-fashioned stockings which consists in knitting the leg fabric, the instep fabric, the toe fabric, the sole fabrics, and the high heel fabrics as a continuous unitary blank; cutting the last course of each high heel fabric from the first course of its associated sole fabric; folding the high heel fabrics towards each other to arrange the last courses thereof in straight alignment, with certain loops thereof in overlapping relationship; topping the first courses of the sole fabrics and the aligned courses of the high heel fabrics upon the needles of a knitting machine; knitting single continuous courses across both high heel fabrics and interknitting certain loops thereof in overlapping relationship with the first courses of the sole fabrics until the heel has been completed; then removing the blank from the knitting machine, topping the last course of the toe fabric on the needles of the knitting machine, and interknitting a portion of such course with the remaining portion of said course.

3. The method of knitting full-fashioned stockings which consists in knitting the leg fabric, the instep fabric, the toe fabric, the sole fabrics, and the high heel fabrics as a continuous unitary blank; separating the last course of each high heel fabric from the first course of its associated sole fabric; folding the high heel fabrics towards each other to arrange the last courses thereof in straight alignment, with the opposing end loops overlapping; topping the first courses of the sole fabrics and the aligned courses of the high heel fabrics upon the needles of a knitting machine; knitting single continuous courses across both high heel fabrics and interknitting certain loops thereof in overlapping relationship with the first courses of the sole fabrics until the heel has been completed; then interknitting a portion of the last heel course with the remaining portion of said last course.

4. The method of knitting full-fashioned stockings which consists in knitting the leg fabric, the instep fabric, the toe fabric, the sole fabrics, and the high heel fabrics as a continuous unitary blank; cutting the last course of each high heel fabric from the first course of its associated sole fabric; folding the high heel fabrics towards each other to arrange the last courses thereof in straight alignment, with certain loops thereof in overlapping relationship; topping the first courses of the sole fabrics and the aligned courses of the high heel fabrics upon the needles of a knitting machine; knitting single continuous courses across both high heel fabrics and interknitting certain loops thereof in overlapping relationship with the first courses of the sole fabrics until the heel fabric has been completed; interknitting a portion of the last course of the heel fabric with the remaining portion of such course, and then removing the blank from the knitting machine and interknitting a portion of the last course of the toe fabric with the remaining portion of such course.

5. The method of knitting full-fashioned stockings which consists in knitting the leg fabric, the high heel fabrics, the instep fabric, the toe fabric, and the sole fabrics as a continuous unitary blank; cutting the last course of each high heel fabric from the first course of its associated sole fabric; folding the high heel fabrics towards each other to arrange the last courses thereof in straight alignment, with certain loops thereof in overlapping relationship; topping the first courses of the sole fabrics and the aligned courses of the high heel fabrics upon the needles of a knitting machine; knitting continuous courses across both high heel fabrics and interknitting certain loops thereof in overlapping relationship with the first courses of the sole fabrics until the heel fabric has been completed; interknitting a portion of the last heel course with the remaining portion of said last course; then removing the blank from the knitting machine and interknitting a portion of the last course of the toe fabric with the remaining portion of such course and finally seaming the remaining selvedge edge portions of the stocking blank.

6. The method of knitting full-fashioned stockings which consists in knitting the leg blank and foot blank as a unitary fabric with the high heel portions of the leg blank directly interknitted with the sole portions of the foot blank; then separating the last course of each high heel portion from the first course of its associated sole portion and folding the high heel portions towards each other to arranged the last courses thereof in a straight line relation with the first courses of the sole portions; placing all of said courses on the needles of a full-fashioned hosiery knitting machine, with the opposing end loops of said courses of the high heel portions contiguous with each other and knitting continuous courses across both high heel portions and, simultaneously therewith, interknitting loops of the sole courses with loops of the continuous courses knitted to the high heel portions.

7. The method of knitting full-fashioned stockings which consists in knitting the leg fabric, the instep fabric, the toe fabric, the sole fabrics, and the high heel fabrics as a continuous unitary blank; separating the last course of each high heel fabric from the first course of its associated sole fabric; folding the high heel fabrics towards each other to arrange the last courses thereof in straight alignment, with certain loops thereof in overlapping relationship; topping the first courses of the sole fabrics and the aligned courses of the high heel fabrics upon the needles of a knitting machine; knitting single continuous courses across both high heel fabrics and interknitting certain loops thereof in overlapping relationship with the first courses of the sole fabrics until the heel fabric has been completed; then removing the blank from the knitting machine and topping the last course of the toe fabric on the needles of the knitting machine, and interknitting with a separate independent thread a portion of such course with the remaining portion of said course.

8. The method of knitting full-fashioned stockings consisting in knitting the leg fabric, the high heel fabrics, the sole fabrics, the instep fabric, and the toe fabric as a unitary blank; folding the high heel fabrics towards each other to align the terminal courses thereof with each other and with the first courses of the sole fabrics; topping the same upon the needles of a knitting machine; knitting a course to the terminal courses of the high heel fabrics to interconnect the same; and knitting heel courses onto said interconnecting course.

9. The method of knitting full-fashioned stockings consisting in knitting the leg fabric, the high heel fabrics, the sole fabrics, the instep fabric, and the toe fabric as a unitary blank; folding the high heel fabrics towards each other to align the terminal courses thereof with each other and with the first courses of the sole fabrics, topping the same upon the needles of a knitting machine; knitting a course to the terminal courses of the high heel fabrics to interconnect the same; and knitting heel courses onto said interconnecting course while transferring successively loops of the first courses of the sole fabrics into knitting position with the courses being knitted to the high heel fabric connecting course.

10. The method of knitting full-fashioned stockings consisting in knitting the leg fabric, the high heel fabrics, the sole fabrics, the instep fabric, and the toe fabric as a unitary blank; folding the high heel fabrics towards each other to align the terminal courses thereof with each other and with the first courses of the sole fabrics, topping the same upon the needles of a knitting machine; knitting a course to the terminal courses of the high heel fabrics to interconnect the same; adding heel courses onto said interconnecting course while transferring successively loops of the first courses of the sole fabrics into knitting position with the courses being added to the high heel fabric connecting course and, simultaneously therewith, narrowing certain of said added courses.

11. The method of securing the terminal courses of high heel hosiery fabrics which consists in placing the terminal courses upon the needles of a knitting machine with opposing loops in overlapping relationship and interknitting a course of loops with said terminal courses.

12. The method of securing together the terminal courses of high heel fabrics of a full-fashioned stocking which consists in placing the terminal courses of the high heel fabrics upon a row of knitting needles with the opposed end loops of said terminal courses contiguous to each other, and interknitting a continuous course with said terminal courses.

13. In combination in a straight knitting machine, a row of needles adapted to receive series of yarn loops, control means for said needles operable to selectively render certain needles active and certain other needles inactive, mechanism including means for laying yarns and knitting courses on the active needles as continuations of the yarn loops thereon, and mechanism for gradually transferring the yarn loops on the inactive needles to certain of the active needles and causing the transferred loops to be interknitted with said courses, means operable for actuating said needle control means to render successive needles inactive as the transfer of said loops progresses; and means cofunctioning with the last mentioned means to transfer the loops in accordance with the number of needles rendered inactive.

14. In combination in a straight knitting machine, a row of needles adapted to receive series of yarn loops, control means for said needles operable to selectively render certain needles active and certain other needles inactive, mechanism including means for laying yarns and knitting courses on the active needles as continuations of the yarn loops thereon, mechanism for transferring the yarn loops on the inactive needles to certain of the active needles causing the transferred loops to be interknitted with said courses, and for transferring certain loops of said courses for narrowing the same, and means operable through the function of the knitting machine for actuating said needle control means to render successive needles inactive as the narrowing of said courses progresses.

15. In combination in a straight knitting machine, a row of needles adapted to receive series of yarn loops, control means for said needles operable to selectively render certain needles active and certain other needles inactive, mechanism including means for laying yarns and knitting courses on the active needles as continuations of the yarn loops thereon, mechanism for transferring the yarn loops on the inactive needles to certain of the active needles causing the transferred loops to be interknitted with said courses, and for transferring certain loops of said courses for narrowing the same, means operable through the function of the knitting machine for actuating said needle control means to render successive needles inactive as the narrowing of said courses progresses, and mechanism operable to adjust said loop transferring means in relation to the active and inactive needles.

16. In combination in a straight knitting machine, a row of needles adapted to receive series of yarn loops, control means for said needles operable to selectively render certain needles active and certain other needles inactive, mechanism including means for laying yarns and knitting courses on the active needles as continuations of the yarn loops thereon, mechanism for transferring the yarn loops on the inactive needles to certain of the active needles causing the transferred loops to be interknitted with said courses, and for transferring certain loops of said courses for narrowing the same, means operable through the function of the knitting machine for actuating said needle control means to render successive needles inactive as the narrowing of said courses progresses, and mechanisms controlled by the operation of the knitting machine to automatically adjust said loop transferring means in relation to the active and inactvie needles.

17. In combination in a straight knitting machine, a row of needles adapted to receive series of yarn loops, control means for said needles operable to selectively render certain needles active and certain other needles inactive, mechanism including means for laying yarns and knitting courses on the active needles as continuations of the yarn loops thereon, mechanism for transferring the yarn loops on the inactive needles to certain of the active needles causing the transferred loops to be interknitted with said courses, and for transferring certain loops of said courses for narrowing the same, and mechanisms operable to adjust said loop transferring means in relation to the active and inactive needles.

18. In combination in a straight knitting machine, a row of needles adapted to receive series of yarn loops, control means for said needles operable to selectively render certain needles active and certain other needles inactive, mechanism including means for laying yarns and knitting courses on the active needles as continuations of the yarn loops thereon, mechanism for transferring the yarn loops on the inactive needles to certain of the active needles causing the transferred loops to be interknitted with said courses, and for transferring certain loops of said courses for narrowing the same, and mechanism controlled by the operation of the knitting machine to automatically adjust said loop transferring mechanism in relation to the active and inactive needles.

19. In combination in a straight knitting machine, a row of needles adapted to receive series of yarn loops, control means for said needles operable to selectively render certain needles active and certain other needles inactive, mech-anism including means for laying yarns and knitting courses on the active needles as continuations of the yarn loops thereon, mechanism for transferring the yarn loops on the inactive needles to certain of the active needles causing the transferred loops to be interknitted with said courses, and for transferring certain loops of said courses for narrowing the same, mechanisms operable to adjust said loop transferring means in relation to the active and inactive needles, and a pattern chain associated with said loop transferring means adjusting mechanism to control the function thereof.

20. In a method of knitting a heel fabric into a knitted combination leg and foot hosiery blank having separated leg and foot portions: supporting a course of each of the separated leg and foot portions in alignment upon needles of a knitting machine with the supported leg portions adjacent one another; interknitting a course of loops with the supported courses of the separated leg portions to interconnect the same; continuing the knitting of heel fabric courses as continuations of said interconnecting course; and interknitting the supported courses of the separated foot portions with heel fabric courses as the knitting thereof progresses.

21. In a method of knitting a heel fabric into a knitted combination leg and foot hosiery blank having separated high heel and sole portions: supporting a course of each of the separated high heel and sole portions in alignment upon needles of a knitting machine with the supported high heel portions adjacent one another; interknitting a course of loops with the supported courses of the separated high heel portions to interconnect the same; continuing the knitting of heel fabric courses as continuations of said interconnecting course; and interknitting the supported courses of the separated sole portions with heel fabric courses as the knitting thereof progresses.

22. In a method of knitting a heel fabric into a knitted combination leg and foot hosiery blank having separated high heel and sole portions: supporting the last course of each of the high heel portions and the first course of each of the sole portions in alignment upon needles of a knitting machine with the high heel portions adjacent one another; interknitting a course of loops with the supported last course of the high heel portions to interconnect the same; continuing the knitting of heel fabric courses as continuations of said interconnecting course; and interknitting the supported first courses of the sole portions with heel fabric courses as the knitting thereof progresses.

23. In a method of knitting a heel fabric into a knitted combination leg and foot hosiery blank having separated leg and foot portions: supporting a course of each of the separated leg and foot portions in alignment upon needles of a knitting machine with the supported leg portions adjacent one another; interknitting a course of loops with the supported courses of the separated leg portions to interconnect the same; continuing the knitting of heel fabric courses as continuations of said interconnecting course; interknitting the supported courses of the separated foot portions with heel fabric courses as the knitting thereof progresses; and narrowing certain of the heel fabric courses to shape the fabric.

24. In a method of knitting a heel fabric into a knitted combination leg and foot hosiery blank having separated high heel and sole portions: supporting a course of each of the separated high heel and sole portions in alignment upon needles of a knitting machine with the supported high heel portions adjacent one another; interknitting a course of loops with the supported courses of the separated high heel portions to interconnect the same; continuing the knitting of heel fabric courses as continuations of said interconnecting course; interknitting the supported courses of the separated sole portions with heel fabric courses as the knitting thereof progresses; and narrowing certain of the heel fabric courses to shape the fabric.

25. In a method of knitting a heel fabric into a knitted combination leg and foot hosiery blank having separated high heel and sole portions: supporting the last course of each of the high heel portions and the first course of each of the sole portions in alignment upon needles of a knitting machine with the high heel portions adjacent one another; interknitting a course of loops with the supported last course of the high heel portions to interconnect the same; continuing the knitting of heel fabric courses as continuations of said interconnecting course; interknitting the supported first courses of the sole portions with heel fabric courses as the knitting thereof progresses; and narrowing certain of the heel fabric courses to shape the fabric.

26. In a method of knitting a heel fabric onto portions of knitted hosiery leg fabric blank: supporting a course of each of said portions in alignment upon needles of a knitting machine; interknitting a course of loops with said courses of the portions to interconnect the same; continuing the knitting of heel courses as continuations of said interconnecting course; knitting series of loops as continuations of certain intermediate loops of the last heel fabric course; and interknitting the side loops of said last heel fabric course with said series of loops as the knitting thereof progresses.

27. In a method of knitting a heel fabric onto portions of knitted hosiery leg fabric blank: supporting the terminal course of each of said portions in alignment upon needles of a knitting machine; interknitting a course of loops with said terminal courses of the portions to interconnect the same; continuing the knitting of heel courses as continuations of said interconnecting course; knitting series of loops as continuations of certain intermediate loops of the last heel fabric course; and interknitting the side loops of said last heel fabric course with said series of loops as the knitting thereof progresses.

28. In a method of knitting a heel fabric onto the high heel portions of a hosiery blank: supporting the terminal course of each of the high heel portions in alignment upon needles of a knitting machine; interknitting a course of loops with said terminal courses of the high heel portions to interconnect the same; continuing the knitting of heel courses as continuations of said interconnecting course; knitting series of loops as continuations of certain intermediate loops of the last heel fabric course; and interknitting the side loops of said last heel fabric course with said series of loops as the knitting thereof progresses.

29. In a method of knitting a heel fabric onto portions of knitted hosiery leg fabric blank: supporting a course of each of said portions in alignment upon needles of a knitting machine; interknitting a course of loops with said courses of the portions to interconnect the same; continuing the knitting of heel courses as continuations of said interconnecting course; narrowing certain of said heel courses to shape the heel fabric; knitting series of loops as continuations of certain intermediate loops of the last heel fabric course; and interknitting the side loops of said last heel fabric course with said series of loops as the knitting thereof progresses.

30. In a method of knitting a heel fabric onto portions of knitted hosiery leg fabric blank: supporting the terminal course of each of said portions in alignment upon needles of a knitting machine; interknitting a course of loops with said terminal courses of the portions to interconnect the same; continuing the knitting of heel courses as continuations of said interconnecting course; narrowing certain of said heel courses to shape the heel fabric; knitting series of loops as continuations of certain intermediate loops of the last heel fabric course; and interknitting the side loops of said last heel fabric course with said series of loops as the knitting thereof progresses.

31. In a method of knitting a heel fabric onto the high heel portions of a hosiery blank: supporting the terminal course of each of the high heel portions in alignment upon needles of a knitting machine; interknitting a course of loops with said terminal course of the high heel portions to interconnect the same; continuing the knitting of heel courses as continuations of said interconnecting course; narrowing certain of said heel courses to shape the heel fabric; knitting series of loops as continuations of certain intermediate loops of the last heel fabric course; and interknitting the side loops of said last heel fabric course with said series of loops as the knitting thereof progresses.

32. In a method of knitting a heel fabric into a knitted combination leg and foot hosiery blank having separated leg and foot portions: supporting a course of each of the separated leg and foot portions in alignment upon needles of a knitting machine with the supported leg portions adjacent one another; interknitting a course of loops with the supported courses of the separated leg portions to interconnect the same; continuing the knitting of heel fabric courses as continuations of said interconnecting course; interknitting the supported courses of the separated foot portions with heel fabric courses as the knitting thereof progresses; knitting series of loops as continuations of certain intermediate loops of the last heel fabric course; and interknitting the side loops of said last heel fabric course with said series of loops as the knitting thereof progresses.

33. In a method of knitting a heel fabric into a knitted combination leg and foot hosiery blank having separated high heel and sole portions: supporting a course of each of the separated high heel and sole portions in alignment upon needles of a knitting machine with the supported high heel portions adjacent one another; interknitting a course of loops with the supported courses of the separated high heel portions to interconnect the same; continuing the knitting of heel fabric courses as continuations of said interconnecting course; interknitting the supported courses of the separated sole portions with heel fabric courses as the knitting thereof progresses; knitting series of loops as continuations of certain intermediate loops of the last heel fabric course; and interknitting the side loops of said last heel fabric course with said series of loops as the knitting thereof progresses.

34. In a method of knitting a heel fabric into a knitted combination leg and foot hosiery blank having separated high heel and sole portions: supporting the last course of each of the high heel portions and the first course of each of the sole portions in alignment upon needles of a knitting machine with the high heel portions adjacent one another; interknitting a course of loops with the supported last course of the high heel portions to interconnect the same; continuing the knitting of heel fabric courses as continuations of said interconnecting course; interknitting the supported first courses of the sole portions with heel fabric courses as the knitting thereof progresses; knitting series of loops as continuations of certain intermediate loops of the last heel fabric course; and interknitting the side loops of said last heel fabric course with said series of loops as the knitting thereof progresses.

35. In a method of knitting a heel fabric into a knitted combination leg and foot hosiery blank having separated leg and foot portions: supporting a course of each of the separated leg and foot portions in alignment upon needles of a knitting machine with the supported leg portions adjacent one another; interknitting a course of loops with the supported courses of the separated leg portions to interconnect the same; continuing the knitting of heel fabric courses as continuations of said interconnecting course; interknitting the supported courses of the separated foot portions with heel fabric courses as the knitting thereof progresses; narrowing certain of the heel fabric courses to shape the fabric; knitting series of loops as continuations of certain intermediate loops of the last heel fabric course; and interknitting the side loops of said last heel fabric course with said series of loops as the knitting thereof progresses.

36. In a method of knitting a heel fabric into a knitted combination leg and foot hosiery blank having separated high heel and sole portions: supporting a course of each of the separated high heel and sole portions in alignment upon needles of a knitting machine with the supported high heel portions adjacent one another; interknitting a course of loops with the supported courses of the separated high heel portions to interconnect the same; continuing the knitting of heel fabric courses as continuations of said interconnecting course; interknitting the supported courses of the separated sole portions with heel fabric courses as the knitting thereof progresses; narrowing certain of the heel fabric courses to shape the fabric; knitting series of loops as continuations of certain intermediate loops of the last heel fabric course; and interknitting the side loops of said last heel fabric course with said series of loops as the knitting thereof progresses.

37. In a method of knitting a heel fabric into a knitted combination leg and foot hosiery blank having separated high heel and sole portions: supporting the last course of each of the high heel portions and the first course of each of the sole portions in alignment upon needles of a knitting machine with the high heel portions adjacent one another; interknitting a course of loops with the supported last course of the high heel portions to interconnect the same; continuing the knitting of heel fabric courses as continuations of said interconnecting course; interknitting the supported first courses of the sole portions with heel fabric courses as the knitting thereof progresses; narrowing certain of the heel fabric courses to shape the fabric; knitting series of loops as continuations of certain intermediate loops of the last heel fabric course; and interknitting the side loops of said last heel fabric course with said series of loops as the knitting thereof progresses.

38. In combination, in a straight knitting machine, a needle bar, an intermediate set of needles on the bar to receive series of yarn loops to which further loops are to be knitted, two end sets of non-knitting needles also on said bar to receive other series of yarn loops, mechanism including means for laying a continuous yarn across the entire intermediate set of knitting needles to feed said yarn to all the intermediate needles, and knit courses from said yarn on the series of yarn loops received on said set of knitting needles, and means for transferring loops from said end sets of non-knitting needles to the selvedge loops of such continuous courses knitted by the intermediate set of knitting needles, and causing the transferred loops to be interknitted with said selvedge loops.

39. In combination, in a straight knitting machine, a needle bar, an intermediate set of needles on the bar to receive series of yarn loops to which further loops are to be knitted, two end sets of non-knitting needles also on said bar to receive other series of yarn loops, mechanism including means for laying a continuous yarn across the entire intermediate set of knitting needles to feed said yarn to all the intermediate needles, and knit courses from said yarn on the series of yarn loops received on said set of knitting needles, and means for transferring loops from said end sets of nonknitting needles to the selvedge loops of such continuous courses knitted by the intermediate set of knitting needles, and causing the transferred lops to be interknitted with said selvedge loops, and operable to transfer inwardly certain loops of certain of said courses.

40. In a knitting machine for knitting a one-piece fashioned heel fabric into a combination leg and foot stocking blank by knitting said heel fabric to corresponding course portions in the blank and successively transferring loops of other course portions in the blank to loops of said heel fabric as the knitting thereof progresses, the combination of: loop manipulating and fashioning mechanism comprising transfer point means and a loop manipulating implement structure including two end sets of non-knitting needles and an intermediate set of knitting needles, the loops of the first mentioned course portions to be topped onto the intermediate set of knitting needles, and the loops of the second mentioned course portions to be topped onto the end sets of non-knitting needles, and means for actuating and controlling said loop manipulating and fashioning mechanism provided for knitting courses across the entire intermediate set of knitting needles from a continuous yarn fed to all the intermediate needles and for narrowing on certain needles of said intermediate set of knitting needles, and transferring loops from the end sets of non-knitting needles to loops formed on the intermediate set of knitting needles.

41. In a knitting machine for knitting a one-piece fashioned heel fabric into a combination leg and foot stocking blank by knitting said heel fabric to corresponding course portions in the blank and successively transferring loops of other course portions in the blank to loops of said heel fabric as the knitting thereof progresses, the combination of: loop forming and positioning mechanism comprising transfer point means and a loop manipulating implement structure including two end sets of non-knitting needles and an intermediate set of knitting needles, the loops of the first mentioned course portions to be topped onto the intermediate set of knitting needles, and the loops of the second mentioned course portions to be topped onto the end sets of non-knitting needles, and means for actuating and controlling said loop forming and positioning mechanism providing for knitting courses across the entire intermediate set of knitting needles from a continuous yarn fed to all the intermediate needles, and transferring loops from the end sets of non-knitting needles to loops formed on the intermediate set of knitting needles.

42. In a flat knitting machine, in combination: at least two sets of needles; means cooperating with one set of needles to knit successive courses thereby; means for successively transferring loops from the other set of needles onto the first set of needles as the courses of loops are knitted by the latter; and means for selectively rendering certain of the needles of the first mentioned set of needles inactive in the knitting of loops.

43. In a flat knitting machine, in combination: a set of non-knitting needles adapted to have topped thereon a course of loops of a fabric; a set of knitting needles; means cooperating with said set of knitting needles to knit successive courses thereby; means for successively transferring loops from the set of non-knitting needles onto the set of knitting needles as the courses are knitted by said set of knitting needles; and means for selectively rendering certain of the needles of said set of knitting needles inactive in the knitting of loops.

44. In a flat knitting machine, in combination: at least two sets of needles; means cooperating with one set of needles to knit successive courses thereby; means for successively and progressively transferring loops from the other set of needles onto the first set of needles as the courses of loops are knitted by the latter; and means for selectively and progressively rendering certain of the needles of the first mentioned set of needles inactive in the knitting of loops.

45. In a flat knitting machine, in combination: a set of non-knitting needles adapted to have topped thereon a course of loops of a fabric; a set of knitting needles; means cooperating with said set of knitting needles to knit successive courses thereby; means for successively and progressively transferring loops from the set of non-knitting needles onto the set of knitting needles as the courses are knitted by said set of knitting needles; and means for selectively and progressively rendering certain of the needles of said set of knitting needles inactive in the knitting of loops.

46. In a knitting machine having two groups of needles and associated knitting elements including yarn carriers and sinkers, the combination of a yarn carrier and sinker slur cock assembly associated with each of said groups of needles, driving connections for the machine including a cam shaft, connections therefrom for reciprocating said assemblies simultaneously in opposite directions towards and away from each other, and members simultaneously operating in opposite directions for selectively rendering certain of the needles of each group inactive in the knitting of loops.

47. In a flat knitting machine having needles, yarn carriers, and sinkers, the combination of two yarn carriers and sinker slur cock assemblies for laying and sinking yarns simultaneously on different groups of said needles, means for reciprocating said assemblies to lay and sink yarns simultaneously in opposite directions on said groups of needles, and members simultaneously operating in opposite directions to selectively render certain of the needles in each group inactive in the knitting of loops.

48. A presser attachment for a flat knitting machine having a bank of needles and a narrowing mechanism, comprising a group of individual presser fingers operatively associated with said needles, means for selectively controlling the operation of said fingers and thereby selectively controlling the operation of said needles, and an operative connection between said first means and said narrowing means.

49. A presser attachment for a flat knitting machine having a bank of needles, a narrowing mechanism, and a main cam shaft, comprising a group of individual presser fingers operatively associated with said needles, means for selectively controlling the operation of said fingers thereby selectively controlling the operation of said needles, and means for operating said first means from said narrowing mechanism and said cam shaft.

50. A presser attachment for a flat knitting machine having a bank of needles, a narrowing mechanism, and a main cam shaft comprising a group of individual presser fingers operatively associated with said needles, a shiftable rotatable shaft adapted in its shiftable and rotatable movements to selectively and progressively operate said presser fingers, an operative connection between said shaft and said narrowing mechanism whereby said shaft may be shifted, a gear on said shiftable shaft, a cam on said main cam shaft, a rock lever operatively associated with said cam, a gear segment operatively associated with said gear, and a link connection between said gear segment and said lever whereby said shiftable lever may be rotated.

51. A presser attachment for a flat knitting machine having a bank of needles and a main cam shaft, comprising a group of individual presser elements, a rockable shaft rotatably arranged in stationary bearings of the machine, said rockable shaft having a direct selective operative connection with said elements whereby in the rocking of the rockable shaft the said elements may be selectively operated, and an operative connection between said cam shaft and said rockable shaft.

52. In a knitting machine having two groups of needles and associated knitting elements including yarn carriers and sinkers, the combination of a yarn carrier and a sinker slur cock assembly associated with each of said groups of needles, means for reciprocating said two yarn carrier and sinker slur cock assemblies to lay and sink yarns simultaneously in opposite directions on said groups of needles, groups of individual presser fingers operatively associated with said groups of needles, and means for selectively controlling the operation of the outer fingers of each group of individual presser fingers and thereby selectively rendering inactive the outer end needles of each group of needles.

FRITZ LAMBACH.